United States Patent
Walton et al.

(10) Patent No.: US 8,218,609 B2
(45) Date of Patent: Jul. 10, 2012

(54) CLOSED-LOOP RATE CONTROL FOR A MULTI-CHANNEL COMMUNICATION SYSTEM

(75) Inventors: Jay Rodney Walton, Carlisle, MA (US); Mark S. Wallace, Bedford, MA (US); John W. Ketchum, Harvard, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 886 days.

(21) Appl. No.: 10/448,801

(22) Filed: May 31, 2003

(65) Prior Publication Data
US 2004/0120411 A1 Jun. 24, 2004

Related U.S. Application Data

(60) Provisional application No. 60/421,309, filed on Oct. 25, 2002.

(51) Int. Cl.
| H04B 1/38 | (2006.01) |
| H04L 27/00 | (2006.01) |
| H04L 23/00 | (2006.01) |
| H04L 27/28 | (2006.01) |
| H04L 7/06 | (2006.01) |

(52) U.S. Cl. ........ 375/219; 375/316; 375/377; 375/260; 375/358

(58) Field of Classification Search ................ 375/260, 375/295, 316, 347, 259, 322, 334, 346, 141, 375/221, 296, 267, 377, 340, 219, 358, 299, 375/337, 349, 350; 455/130; 370/208, 210
See application file for complete search history.

(56) References Cited

U.S. PATENT DOCUMENTS

| 4,736,371 A | 4/1988 | Tejima et al. |
| 4,750,198 A | 6/1988 | Harper |
| 4,797,879 A | 1/1989 | Habbab et al. |

(Continued)

FOREIGN PATENT DOCUMENTS

AU 2002259221 11/2002

(Continued)

OTHER PUBLICATIONS

M.A.Kousa, et al., "Multichannel adaptive system" Oct. 5, 1993, IEEE, vol. 140, No. 5, p. 357-364.*

(Continued)

*Primary Examiner* — Tesfaldet Bocure
(74) *Attorney, Agent, or Firm* — Qualcomm Patent Group; James H. Yancey, Jr.

(57) ABSTRACT

Closed-loop rate control for data transmission on multiple parallel channels is provided. An inner loop estimates the channel conditions for a communication link and selects a suitable data rate for each of the multiple parallel channels based on the channel estimates. For each parallel channel, a received SNR is computed based on the channel estimates, an operating SNR is computed based on the received SNR and an SNR offset for the parallel channel, and the data rate is selected based on the operating SNR for the parallel channel and a set of required SNRs for a set of data rates supported by the system. An outer loop estimates the quality of data transmissions received on the multiple parallel channels and adjusts the operation of the inner loop. For example, the SNR offset for each parallel channel is adjusted based on the status of packets received on that parallel channel.

16 Claims, 12 Drawing Sheets

U.S. PATENT DOCUMENTS

| | | | |
|---|---|---|---|
| 5,241,544 A | 8/1993 | Jasper et al. | |
| 5,295,159 A | 3/1994 | Kerpez | |
| 5,404,355 A | 4/1995 | Raith | |
| 5,471,647 A | 11/1995 | Gerlach et al. | |
| 5,479,447 A | 12/1995 | Chow et al. | |
| 5,493,712 A | 2/1996 | Ramesh et al. | |
| 5,506,861 A | 4/1996 | Bottomley | |
| 5,509,003 A | 4/1996 | Snijders et al. | |
| 5,606,729 A | 2/1997 | D'amico | |
| 5,638,369 A | 6/1997 | Ayerst et al. | |
| 5,677,909 A | 10/1997 | Heide | |
| 5,729,542 A | 3/1998 | Dupont | |
| 5,790,550 A | 8/1998 | Peeters et al. | |
| 5,818,813 A | 10/1998 | Saito et al. | |
| 5,822,374 A | 10/1998 | Levin | |
| 5,832,387 A | 11/1998 | Bae et al. | |
| 5,867,478 A | 2/1999 | Baum et al. | |
| 5,867,539 A | 2/1999 | Koslov | |
| 5,886,988 A | 3/1999 | Yun et al. | |
| 5,959,965 A | 9/1999 | Ohkubo et al. | |
| 5,973,638 A | 10/1999 | Robbins et al. | |
| 5,982,327 A | 11/1999 | Vook et al. | |
| 6,049,548 A | 4/2000 | Bruno et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,163,296 A | 12/2000 | Lier et al. | |
| 6,167,031 A | 12/2000 | Olofsson et al. | |
| 6,178,196 B1 | 1/2001 | Naguib et al. | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,275,543 B1 | 8/2001 | Petrus et al. | |
| 6,278,726 B1 | 8/2001 | Mesecher et al. | |
| 6,292,917 B1 * | 9/2001 | Sinha et al. | 714/752 |
| 6,298,035 B1 | 10/2001 | Heiskala | |
| 6,298,092 B1 * | 10/2001 | Heath et al. | 375/267 |
| 6,308,080 B1 | 10/2001 | Burt et al. | |
| 6,314,113 B1 | 11/2001 | Guemas | |
| 6,314,289 B1 | 11/2001 | Eberlein et al. | |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,351,499 B1 | 2/2002 | Paulraj et al. | |
| 6,363,267 B1 | 3/2002 | Lindskog et al. | |
| 6,377,812 B1 | 4/2002 | Rashid-Farrokhi et al. | |
| 6,385,264 B1 | 5/2002 | Terasawa et al. | |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly, Jr. et al. | |
| 6,631,121 B1 | 10/2003 | Yoon | |
| 6,636,496 B1 | 10/2003 | Cho et al. | |
| 6,636,568 B2 | 10/2003 | Kadous | |
| 6,654,590 B2 | 11/2003 | Boros et al. | |
| 6,654,613 B1 * | 11/2003 | Maeng et al. | 455/522 |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,697,346 B1 | 2/2004 | Halton et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,751,187 B2 | 6/2004 | Walton et al. | |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 * | 7/2004 | Gesbert et al. | 714/774 |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna et al. | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,847,828 B2 | 1/2005 | Miyoshi et al. | |
| 6,850,252 B1 | 2/2005 | Hoffberg | |
| 6,850,498 B2 | 2/2005 | Heath et al. | |
| 6,862,271 B2 * | 3/2005 | Medvedev et al. | 370/329 |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,885,708 B2 | 4/2005 | Thomas et al. | |
| 6,888,809 B1 | 5/2005 | Foschini et al. | |
| 6,888,899 B2 * | 5/2005 | Raleigh et al. | 375/299 |
| 6,891,858 B1 | 5/2005 | Mahesh et al. | |
| 6,920,192 B1 | 7/2005 | Laroia et al. | |
| 6,920,194 B2 | 7/2005 | Stopler et al. | |
| 6,927,728 B2 | 8/2005 | Vook et al. | |
| 6,937,592 B1 | 8/2005 | Heath, Jr. et al. | |
| 6,940,917 B2 | 9/2005 | Menon et al. | |
| 6,950,632 B1 * | 9/2005 | Yun et al. | 455/69 |
| 6,952,426 B2 | 10/2005 | Wu et al. | |
| 6,952,454 B1 | 10/2005 | Jalali et al. | |
| 6,956,813 B2 | 10/2005 | Fukuda | |
| 6,956,906 B2 * | 10/2005 | Tager et al. | 375/260 |
| 6,959,171 B2 | 10/2005 | Tsien et al. | |
| 6,963,742 B2 | 11/2005 | Boros et al. | |
| 6,965,762 B2 | 11/2005 | Sugar et al. | |
| 6,980,601 B2 | 12/2005 | Jones | |
| 6,980,800 B2 | 12/2005 | Noerpel et al. | |
| 6,985,434 B2 | 1/2006 | Wu et al. | |
| 6,985,534 B1 | 1/2006 | Meister | |
| 6,987,819 B2 | 1/2006 | Thomas et al. | |
| 6,990,059 B1 | 1/2006 | Anikhindi et al. | |
| 6,992,972 B2 | 1/2006 | Van Nee | |
| 6,996,380 B2 * | 2/2006 | Dent | 455/101 |
| 7,003,044 B2 | 2/2006 | Subramanian et al. | |
| 7,006,464 B1 | 2/2006 | Gopalakrishnan et al. | |
| 7,006,483 B2 | 2/2006 | Nelson, Jr. et al. | |
| 7,006,848 B2 | 2/2006 | Ling et al. | |
| 7,009,931 B2 | 3/2006 | Ma et al. | |
| 7,012,978 B2 | 3/2006 | Talwar | |

| Patent No. | Date | Inventor(s) | Ref |
|---|---|---|---|
| 7,020,110 B2 * | 3/2006 | Walton et al. | 370/334 |
| 7,020,482 B2 * | 3/2006 | Medvedev et al. | 455/522 |
| 7,020,490 B2 | 3/2006 | Khatri et al. | |
| 7,023,826 B2 | 4/2006 | Sjoberg et al. | |
| 7,031,671 B2 | 4/2006 | Mottier | |
| 7,035,359 B2 | 4/2006 | Molnar et al. | |
| 7,039,125 B2 | 5/2006 | Friedman | |
| 7,058,367 B1 | 6/2006 | Luo et al. | |
| 7,062,294 B1 | 6/2006 | Rogard et al. | |
| 7,068,628 B2 | 6/2006 | Li et al. | |
| 7,072,381 B2 | 7/2006 | Atarashi et al. | |
| 7,072,410 B1 | 7/2006 | Monsen | |
| 7,072,413 B2 | 7/2006 | Walton et al. | |
| 7,088,671 B1 | 8/2006 | Monsen | |
| 7,095,709 B2 | 8/2006 | Walton et al. | |
| 7,099,377 B2 | 8/2006 | Berens et al. | |
| 7,103,325 B1 * | 9/2006 | Jia et al. | 455/101 |
| 7,110,378 B2 | 9/2006 | Onggosanusi et al. | |
| 7,110,463 B2 | 9/2006 | Wallace et al. | |
| 7,113,499 B2 | 9/2006 | Nafie et al. | |
| 7,116,652 B2 | 10/2006 | Lozano et al. | |
| 7,120,199 B2 * | 10/2006 | Thielecke et al. | 375/267 |
| 7,127,009 B2 | 10/2006 | Berthet et al. | |
| 7,130,362 B2 | 10/2006 | Girardeau et al. | |
| 7,133,459 B2 | 11/2006 | Onggosanusi et al. | |
| 7,137,047 B2 | 11/2006 | Mitlin et al. | |
| 7,149,239 B2 | 12/2006 | Hudson et al. | |
| 7,149,254 B2 | 12/2006 | Sampath | |
| 7,151,809 B2 | 12/2006 | Ketchum et al. | |
| 7,155,171 B2 | 12/2006 | Ebert et al. | |
| 7,158,563 B2 | 1/2007 | Ginis et al. | |
| 7,164,669 B2 | 1/2007 | Li et al. | |
| 7,184,713 B2 | 2/2007 | Kadous et al. | |
| 7,187,646 B2 | 3/2007 | Schramm | |
| 7,190,749 B2 | 3/2007 | Levin et al. | |
| 7,191,381 B2 | 3/2007 | Gesbert et al. | |
| 7,194,237 B2 | 3/2007 | Sugar et al. | |
| 7,197,084 B2 | 3/2007 | Ketchum et al. | |
| 7,200,404 B2 | 4/2007 | Panasik et al. | |
| 7,206,354 B2 | 4/2007 | Wallace et al. | |
| 7,218,684 B2 | 5/2007 | Bolourchi et al. | |
| 7,224,704 B2 | 5/2007 | Lu et al. | |
| 7,231,184 B2 | 6/2007 | Eilts et al. | |
| 7,233,625 B2 | 6/2007 | Ma et al. | |
| 7,238,508 B2 | 7/2007 | Lin et al. | |
| 7,242,727 B2 * | 7/2007 | Liu et al. | 375/295 |
| 7,248,638 B1 | 7/2007 | Banister | |
| 7,248,841 B2 | 7/2007 | Agee et al. | |
| 7,254,171 B2 | 8/2007 | Hudson | |
| 7,260,153 B2 * | 8/2007 | Nissani | 375/259 |
| 7,260,366 B2 | 8/2007 | Lee et al. | |
| 7,263,119 B1 | 8/2007 | Hsu et al. | |
| 7,274,734 B2 | 9/2007 | Tsatsanis | |
| 7,280,625 B2 | 10/2007 | Ketchum et al. | |
| 7,283,508 B2 | 10/2007 | Choi et al. | |
| 7,289,570 B2 | 10/2007 | Schmidl et al. | |
| 7,292,854 B2 | 11/2007 | Das et al. | |
| 7,298,778 B2 | 11/2007 | Visoz et al. | |
| 7,298,805 B2 | 11/2007 | Walton et al. | |
| 7,308,035 B2 | 12/2007 | Rouquette et al. | |
| 7,310,304 B2 | 12/2007 | Mody et al. | |
| 7,317,750 B2 | 1/2008 | Shattil | |
| 7,324,429 B2 | 1/2008 | Walton et al. | |
| 7,327,800 B2 | 2/2008 | Oprea et al. | |
| 7,333,556 B2 | 2/2008 | Maltsev et al. | |
| 7,342,912 B1 | 3/2008 | Kerr et al. | |
| 7,356,004 B2 | 4/2008 | Yano et al. | |
| 7,356,089 B2 | 4/2008 | Jia et al. | |
| 7,379,492 B2 | 5/2008 | Hwang | |
| 7,386,076 B2 | 6/2008 | Onggosanusi et al. | |
| 7,392,014 B2 * | 6/2008 | Baker et al. | 455/67.11 |
| 7,403,748 B1 | 7/2008 | Keskitalo et al. | |
| 7,421,039 B2 | 9/2008 | Malaender et al. | |
| 7,453,844 B1 | 11/2008 | Lee et al. | |
| 7,480,278 B2 | 1/2009 | Pedersen et al. | |
| 7,492,737 B1 | 2/2009 | Fong et al. | |
| 7,508,748 B2 | 3/2009 | Kadous | |
| 7,548,506 B2 | 6/2009 | Ma et al. | |
| 7,551,546 B2 | 6/2009 | Ma et al. | |
| 7,551,580 B2 | 6/2009 | du Crest et al. | |
| 7,573,805 B2 | 8/2009 | Zhuang et al. | |
| 7,599,443 B2 | 10/2009 | Ionescu et al. | |
| 7,603,141 B2 | 10/2009 | Dravida | |
| 7,606,296 B1 | 10/2009 | Hsu et al. | |
| 7,623,871 B2 | 11/2009 | Sheynblat | |
| 7,636,573 B2 | 12/2009 | Walton et al. | |
| 7,653,142 B2 | 1/2010 | Ketchum et al. | |
| 7,653,415 B2 | 1/2010 | Van Rooyen | |
| 2001/0017881 A1 | 8/2001 | Bhatoolaul et al. | |
| 2001/0031621 A1 | 10/2001 | Schmutz | |
| 2001/0046205 A1 | 11/2001 | Easton et al. | |
| 2002/0003774 A1 | 1/2002 | Wang et al. | |
| 2002/0018310 A1 | 2/2002 | Hung | |
| 2002/0018453 A1 | 2/2002 | Yu et al. | |
| 2002/0027951 A1 | 3/2002 | Gormley et al. | |
| 2002/0041632 A1 | 4/2002 | Sato et al. | |
| 2002/0044591 A1 | 4/2002 | Lee et al. | |
| 2002/0044610 A1 | 4/2002 | Jones | |
| 2002/0057659 A1 | 5/2002 | Ozluturk et al. | |
| 2002/0064214 A1 | 5/2002 | Hattori et al. | |
| 2002/0071445 A1 | 6/2002 | Wu et al. | |
| 2002/0072336 A1 | 6/2002 | Mottier | |
| 2002/0075830 A1 | 6/2002 | Hartman, Jr. | |
| 2002/0085620 A1 | 7/2002 | Mesecher | |
| 2002/0085641 A1 | 7/2002 | Baum | |
| 2002/0098872 A1 | 7/2002 | Judson | |
| 2002/0105928 A1 | 8/2002 | Kapoor et al. | |
| 2002/0115473 A1 | 8/2002 | Hwang et al. | |
| 2002/0122383 A1 | 9/2002 | Wu et al. | |
| 2002/0122393 A1 | 9/2002 | Caldwell et al. | |
| 2002/0126803 A1 * | 9/2002 | Jones et al. | 379/22.02 |
| 2002/0127978 A1 * | 9/2002 | Khatri | 455/103 |
| 2002/0132509 A1 * | 9/2002 | Rudrapatna | 455/277.1 |
| 2002/0154705 A1 | 10/2002 | Walton et al. | |
| 2002/0163879 A1 * | 11/2002 | Li et al. | 370/200 |
| 2002/0183010 A1 | 12/2002 | Catreux et al. | |
| 2002/0184453 A1 | 12/2002 | Hughes et al. | |
| 2002/0191535 A1 | 12/2002 | Sugiyama et al. | |
| 2002/0193146 A1 | 12/2002 | Wallace et al. | |
| 2002/0196842 A1 | 12/2002 | Onggosanusi et al. | |
| 2003/0002450 A1 | 1/2003 | Jalali et al. | |
| 2003/0012308 A1 | 1/2003 | Sampath et al. | |
| 2003/0039317 A1 | 2/2003 | Taylor et al. | |
| 2003/0043887 A1 * | 3/2003 | Hudson | 375/144 |
| 2003/0045288 A1 | 3/2003 | Luschi et al. | |
| 2003/0048856 A1 | 3/2003 | Ketchum et al. | |
| 2003/0060173 A1 | 3/2003 | Lee et al. | |
| 2003/0076797 A1 * | 4/2003 | Lozano | 370/334 |
| 2003/0076812 A1 | 4/2003 | Benedittis | |
| 2003/0078024 A1 | 4/2003 | Magee et al. | |
| 2003/0086514 A1 * | 5/2003 | Ginis et al. | 375/346 |
| 2003/0092456 A1 * | 5/2003 | Dent | 455/503 |
| 2003/0095197 A1 | 5/2003 | Wheeler et al. | |
| 2003/0099306 A1 | 5/2003 | Nilsson et al. | |
| 2003/0112745 A1 | 6/2003 | Zhuang et al. | |
| 2003/0119452 A1 | 6/2003 | Kim et al. | |
| 2003/0123381 A1 | 7/2003 | Zhuang et al. | |
| 2003/0123389 A1 | 7/2003 | Russell | |
| 2003/0125040 A1 | 7/2003 | Walton et al. | |
| 2003/0128656 A1 | 7/2003 | Scarpa | |
| 2003/0128658 A1 * | 7/2003 | Walton et al. | 370/208 |
| 2003/0139194 A1 | 7/2003 | Onggosanusi et al. | |
| 2003/0147371 A1 | 8/2003 | Choi et al. | |
| 2003/0153320 A1 | 8/2003 | Noerpel et al. | |
| 2003/0153360 A1 | 8/2003 | Burke et al. | |
| 2003/0157953 A1 | 8/2003 | Das et al. | |
| 2003/0157954 A1 | 8/2003 | Medvedev et al. | |
| 2003/0161282 A1 * | 8/2003 | Medvedev et al. | 370/329 |
| 2003/0162519 A1 | 8/2003 | Smith et al. | |
| 2003/0165189 A1 | 9/2003 | Kadous et al. | |
| 2003/0185309 A1 | 10/2003 | Pautler et al. | |
| 2003/0185311 A1 | 10/2003 | Kim | |
| 2003/0202492 A1 | 10/2003 | Akella et al. | |
| 2003/0202612 A1 | 10/2003 | Halder et al. | |
| 2003/0206558 A1 | 11/2003 | Parkkinen et al. | |
| 2003/0235147 A1 | 12/2003 | Walton et al. | |
| 2003/0235149 A1 | 12/2003 | Chan et al. | |
| 2003/0235255 A1 | 12/2003 | Ketchum et al. | |

| | | | | | | |
|---|---|---|---|---|---|---|
| 2004/0005887 | A1 | 1/2004 | Bahrenburg et al. | EP | 0993211 | 4/2000 |
| 2004/0037257 | A1 | 2/2004 | Ngo | EP | 1061446 | 12/2000 |
| 2004/0042439 | A1 | 3/2004 | Menon et al. | EP | 1075093 | 2/2001 |
| 2004/0042556 | A1 | 3/2004 | Medvedev et al. | EP | 1087545 A1 | 3/2001 |
| 2004/0047292 | A1 | 3/2004 | du Crest et al. | EP | 1117197 A2 | 7/2001 |
| 2004/0052228 | A1 | 3/2004 | Tellado et al. | EP | 1126673 A2 | 8/2001 |
| 2004/0071104 | A1 | 4/2004 | Boesel et al. | EP | 1133070 | 9/2001 |
| 2004/0071107 | A1 | 4/2004 | Kats et al. | EP | 1137217 | 9/2001 |
| 2004/0076224 | A1 | 4/2004 | Onggosanusi et al. | EP | 1143754 | 10/2001 |
| 2004/0082356 | A1 | 4/2004 | Walton et al. | EP | 1170879 | 1/2002 |
| 2004/0085939 | A1 | 5/2004 | Wallace et al. | EP | 1175022 A2 | 1/2002 |
| 2004/0136349 | A1 | 7/2004 | Walton et al. | EP | 1182799 A2 | 2/2002 |
| 2004/0151108 | A1 | 8/2004 | Blasco Claret et al. | EP | 1185001 | 3/2002 |
| 2004/0151122 | A1 | 8/2004 | Lau et al. | EP | 1185015 | 3/2002 |
| 2004/0156328 | A1 | 8/2004 | Walton | EP | 1185048 A2 | 3/2002 |
| 2004/0160987 | A1 | 8/2004 | Sudo et al. | EP | 1 207 645 | 5/2002 |
| 2004/0176097 | A1 | 9/2004 | Wilson et al. | EP | 1207635 | 5/2002 |
| 2004/0179627 | A1 | 9/2004 | Ketchum et al. | EP | 1223702 | 7/2002 |
| 2004/0184398 | A1 | 9/2004 | Walton et al. | EP | 1241824 | 9/2002 |
| 2004/0198276 | A1 | 10/2004 | Tellado et al. | EP | 1265411 | 12/2002 |
| 2004/0252632 | A1 | 12/2004 | Bourdoux et al. | EP | 1315311 A1 | 5/2003 |
| 2005/0047384 | A1 | 3/2005 | Wax et al. | EP | 1379020 | 1/2004 |
| 2005/0047515 | A1 | 3/2005 | Walton et al. | EP | 1387545 | 2/2004 |
| 2005/0099974 | A1 | 5/2005 | Kats et al. | EP | 1416688 A1 | 5/2004 |
| 2005/0120097 | A1 | 6/2005 | Walton et al. | EP | 1447934 A1 | 8/2004 |
| 2005/0128953 | A1 | 6/2005 | Wallace et al. | EP | 1556984 A2 | 7/2005 |
| 2005/0135284 | A1 | 6/2005 | Nanda et al. | GB | 2300337 | 10/1996 |
| 2005/0135295 | A1 | 6/2005 | Walton et al. | GB | 2373973 A | 10/2002 |
| 2005/0135318 | A1 | 6/2005 | Walton et al. | JP | 03104430 | 5/1991 |
| 2005/0147177 | A1 | 7/2005 | Seo et al. | JP | 06003956 | 1/1994 |
| 2005/0185575 | A1 | 8/2005 | Hansen et al. | JP | 06501139 | 1/1994 |
| 2005/0208959 | A1 | 9/2005 | Chen et al. | JP | 08274756 | 10/1996 |
| 2005/0220211 | A1 | 10/2005 | Shim et al. | JP | 9135230 | 5/1997 |
| 2005/0227628 | A1 | 10/2005 | Inanoglu | JP | 9266466 | 10/1997 |
| 2005/0276343 | A1 | 12/2005 | Jones | JP | 9307526 | 11/1997 |
| 2006/0018395 | A1 | 1/2006 | Tzannes | JP | 09327073 | 12/1997 |
| 2006/0067417 | A1 | 3/2006 | Park et al. | JP | 9512156 | 12/1997 |
| 2006/0072649 | A1 | 4/2006 | Chang et al. | JP | 10028077 | 1/1998 |
| 2006/0077935 | A1 | 4/2006 | Hamalainen et al. | JP | 10084324 | 3/1998 |
| 2006/0104196 | A1 | 5/2006 | Wu et al. | JP | 10209956 | 8/1998 |
| 2006/0104340 | A1 | 5/2006 | Walton et al. | JP | 10303794 A | 11/1998 |
| 2006/0153237 | A1 | 7/2006 | Hwang et al. | JP | 10327126 | 12/1998 |
| 2006/0159120 | A1 | 7/2006 | Kim | JP | 1132027 | 2/1999 |
| 2006/0183497 | A1 | 8/2006 | Paranchych et al. | JP | 1141159 | 2/1999 |
| 2006/0209894 | A1 | 9/2006 | Tzannes et al. | JP | 11069431 A | 3/1999 |
| 2006/0209937 | A1 | 9/2006 | Tanaka et al. | JP | 11074863 | 3/1999 |
| 2007/0177681 | A1 | 8/2007 | Choi et al. | JP | 11-163823 | 6/1999 |
| 2007/0274278 | A1 | 11/2007 | Choi et al. | JP | 11205273 | 7/1999 |
| 2008/0069015 | A1 | 3/2008 | Walton et al. | JP | 11252037 A | 9/1999 |
| 2008/0267098 | A1 | 10/2008 | Walton et al. | JP | 2991167 | 12/1999 |
| 2008/0267138 | A1 | 10/2008 | Walton et al. | JP | 2000078105 | 3/2000 |
| 2008/0285488 | A1 | 11/2008 | Walton et al. | JP | 2000092009 A | 3/2000 |
| 2008/0285669 | A1 | 11/2008 | Walton et al. | JP | 2001-044930 | 2/2001 |
| 2008/0285670 | A1 | 11/2008 | Walton et al. | JP | 200186045 | 3/2001 |
| 2010/0067401 | A1 | 3/2010 | Medvedev et al. | JP | 2001186051 | 7/2001 |
| 2010/0119001 | A1 | 5/2010 | Walton et al. | JP | 2001217896 | 8/2001 |
| 2010/0142636 | A1 | 6/2010 | Heath, Jr. et al. | JP | 2001231074 | 8/2001 |
| 2010/0183088 | A1 | 7/2010 | Inanoglu | JP | 2001237751 | 8/2001 |
| 2010/0260060 | A1 | 10/2010 | Abraham et al. | JP | 200264879 | 2/2002 |
| | | | | JP | 2002504283 | 2/2002 |
| | | FOREIGN PATENT DOCUMENTS | | JP | 200277098 | 3/2002 |
| CA | | 2690247 | 10/2001 | JP | 200277104 | 3/2002 |
| CN | | 1086061 | 4/1994 | JP | 2002111627 | 4/2002 |
| CN | | 1234661 | 11/1999 | JP | 2002164814 | 6/2002 |
| CN | | 1308794 | 8/2001 | JP | 2002176379 A | 6/2002 |
| CN | | 1347609 A | 5/2002 | JP | 2002204217 | 7/2002 |
| CN | | 1469662 | 1/2004 | JP | 2002232943 A | 8/2002 |
| CN | | 1489836 A | 4/2004 | JP | 2003504941 | 2/2003 |
| CN | | 1537371 | 10/2004 | JP | 2003198442 | 7/2003 |
| DE | | 19951525 A1 | 6/2001 | JP | 2003530010 | 10/2003 |
| EP | | 0755090 | 1/1997 | JP | 2004266586 | 9/2004 |
| EP | | 0762701 | 3/1997 | JP | 2004297172 | 10/2004 |
| EP | | 0772329 | 5/1997 | JP | 2004535694 | 11/2004 |
| EP | | 0805568 A1 | 11/1997 | JP | 2005519520 | 6/2005 |
| EP | | 0869647 A2 | 10/1998 | JP | 2006504372 | 2/2006 |
| EP | | 0895387 | 2/1999 | KR | 200011799 | 2/2000 |
| EP | | 0929172 A1 | 7/1999 | KR | 20010098861 | 11/2001 |
| EP | | 0951091 A2 | 10/1999 | KR | 1020020003370 | 1/2002 |
| EP | | 0 991 221 | 4/2000 | KR | 20030085040 | 11/2003 |

| | | |
|---|---|---|
| KR | 2006-0095576 | 8/2006 |
| RU | 2015281 C1 | 6/1994 |
| RU | 2139633 | 10/1999 |
| RU | 2141168 | 11/1999 |
| RU | 2146418 C1 | 3/2000 |
| RU | 2149509 | 5/2000 |
| RU | 215132 | 6/2000 |
| RU | 2157592 | 10/2000 |
| RU | 2158479 | 10/2000 |
| RU | 2168278 | 5/2001 |
| RU | 2197781 C2 | 1/2003 |
| RU | 2201034 | 3/2003 |
| RU | 2335852 | 1/2006 |
| TW | 419912 | 1/2001 |
| TW | 545006 B | 8/2003 |
| TW | 583842 B | 4/2004 |
| TW | I230525 | 4/2005 |
| WO | WO8607223 | 12/1986 |
| WO | WO9307684 A1 | 4/1993 |
| WO | WO9507578 | 3/1995 |
| WO | 9530316 | 11/1995 |
| WO | 9532567 | 11/1995 |
| WO | WO9622662 | 7/1996 |
| WO | WO9635268 | 11/1996 |
| WO | 9719525 | 5/1997 |
| WO | WO9736377 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 A1 | 7/1998 |
| WO | WO9857472 | 12/1998 |
| WO | WO9903224 | 1/1999 |
| WO | WO9914878 | 3/1999 |
| WO | WO9916214 | 4/1999 |
| WO | 9944379 | 9/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | 0105067 | 1/2001 |
| WO | WO0126269 | 4/2001 |
| WO | WO0169801 | 9/2001 |
| WO | WO0171928 | 9/2001 |
| WO | 0176110 | 10/2001 |
| WO | 0180510 | 10/2001 |
| WO | 0182521 | 11/2001 |
| WO | WO0182521 A2 | 11/2001 |
| WO | WO0197400 | 12/2001 |
| WO | WO0201732 A2 | 1/2002 |
| WO | WO0203557 A1 | 1/2002 |
| WO | WO0215433 A1 | 2/2002 |
| WO | 0225853 | 3/2002 |
| WO | 02062002 | 8/2002 |
| WO | WO02060138 | 8/2002 |
| WO | WO02065664 | 8/2002 |
| WO | 02069590 | 9/2002 |
| WO | 02073869 | 9/2002 |
| WO | WO02069523 A1 | 9/2002 |
| WO | 02078211 | 10/2002 |
| WO | WO02082689 A2 | 10/2002 |
| WO | WO02088656 | 11/2002 |
| WO | WO02093784 A1 | 11/2002 |
| WO | WO02099992 | 12/2002 |
| WO | 03010984 | 2/2003 |
| WO | WO03010994 A1 | 2/2003 |
| WO | 03019984 | 3/2003 |
| WO | WO03028153 | 4/2003 |
| WO | WO03034646 A2 | 4/2003 |
| WO | WO03047140 A1 | 6/2003 |
| WO | WO03075479 | 9/2003 |
| WO | WO2004002011 | 12/2003 |
| WO | WO2004002047 | 12/2003 |
| WO | 2004039011 | 5/2004 |
| WO | WO2004038985 A2 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

M.A. Kousa, et al., "Multichannel adaptive system," IEE Proceedings-1, vol. 140, No. 5, Oct. 1993, pp. 357-364.

International Search Report—PCT/US03/034570, International Search Authority—European Patent Office, Jun. 17, 2004.

ETSI TS 101 761-1 v1.3.1, "Broadband Radio Access Networks (BRAN); Hiperlan Type 2; Data Link Control (DLC) Layer; Part 1: Basic Data Transport Functions," ETSI Standards, European Telecommunications Standards Institute BR (V131), pp. 1-88 (2001-12).

Fujii, M.: "Pseudo-Orthogonal Multibeam-Time Transmit Diversity for OFDM-CDMA" pp. 222-226 (2002).

Haustein, T. et al.: "Performance of MIMO Systems with Channel Inversion," IEEE 55th Vehicular Technology Conference, Birmingham, Alabama, May 6-9 (2002), pp. 35-39.

Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2000), XP011055296, ISSN: 0733-8716.

Li Lihua, et al.: "A Practical Space-Frequency Block Coded OFDM Scheme for Fast Fading Broadband Channels"13th IEEE International Symposium on Personal Indoor and Mobile Radio Communications. PIMRC 2002. 15-18, Sep., 2002, pp. 212-216 vol. 1, XP00.

Pautler, J. et al.: "On Application of Multiple-Input Multiple-Output Antennas to Cdma Cellular Systems," IEEE 54th Vehicular Technology Conference Proceedings, Atlantic City, New Jersey, Oct. 7-11 (2001), pp. 1508-1512.

Tarighat, A. et al.: "Performance Analysis of Different Algorithms for cdma2000 Antenna Array System and a New Multi User Beamforming (MUB) Algorithm", Wireless Communications and Networking Conference, pp. 409-414 Sep. 2000.

Thoen, S. et al.: "Improved Adaptive Downlink for OFDM/SDMA-Based Wireless Networks," IEEE VTS 53rd Vehicular Technology Conference, pp. 707-711, Rhodes, Greece, May 6-9, (2001).

Tujkovic, D.: "High bandwidth efficiency space-time turbo coded modulation", Institute of Electrical and Electronics, Engineers, ICC 2001. 2001 IEEE International Conference on Communications, Conference Record, pp. 1104-1109, Helsinky, Finland, Jun. 11-14 (2001).

Van Zelst, A. et al.: "Space Division Multiplexing (SDM) for OFDM Systems," IEEE 51st Vehicular Technology Conference Proceedings, pp. 1070-1074, Tokyo, Japan, May 15-18 (2000).

Warner, W. et al.: "OFDM/FM Frame Synchronization for Mobile Radio Data Communication", IEEE Transactions on Vehicular Technology, vol. 42, No. 3, pp. 302-313.

Written Opinion—PCT/US03/034570, IPEA/US—Aug. 11, 2006.

International Preliminary Examination Report—PCT/US03/034570, IPEA/US, Feb 16, 2007.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.

3GPP2 TIA/EIA/IS-2000.2-A, "Physical Layer Standard for cdma2000: Standards for Spread Spectrum Systems," (Mar. 2000), Telecommunications Industry Association, pp. 1-446.

Alamouti, S.M., "A Simple Transmit Diversity Technique for Wireless Communications," IEEE Journal on Select Areas in Communications, vol. 16, No. 8, Oct. 1998, pp. 1451-1458.

Bingham, John A.C.: "Multicarrier Modulation for Data Transmission: An Idea Whose Time Has Come," IEEE Communications Magazine, pp. 5-14 (May 1990).

Chen, K.C. et al., "Novel Space-Time Processing of DS/CDMA Multipath Signal," IEEE 49th, Vehicular Technology Conference, Houston, Texas, May 16-20, 1999, pp. 1809-1813.

Choi, R. et al., "MIMO Transmit Optimization for Wireless Communication Systems," Proceedings of the First IEEE International workshops on Electronic Design, pp. 1-6, Piscataway, New Jersey, Jan. 29-31 (2002).
Chung, J. et al: "Multiple antenna systems for 802.16 systems." IEEE 802.16 Broadband Wireless Access Working Group <http://ieee802.org/16>,IEEE 802.16abc-01/31, Sep. 7, 2001, pp. 1-5.
Co-pending U.S. Appl. No. 60/421,309, filed on Oct. 25, 2002.
Co-pending U.S. Appl. No. 60/421,428, filed on Oct. 25, 2002.
Deneire, Luc, et al.: "A Low Complexity ML Channel Estimator for OFDM," Proc IEEE ICC (June 2001), pp. 1461-1465.
Diggavi, S. et al., "Intercarrier interference in MIMO OFDM," IEEE International Conference on Communications, (Aug. 2002), vol. 1, pp. 485-489, doi: 10.1109/ICC.2002.996901.
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Grunheid et al., "Adaptive Modulation and Multiple Access for the OFDM Transmission Technique", Wireless Personal Communications 13: May 13, 2000, 2000 Kluwer Academic Publishers, pp. 4-13.
Hassibi, B. et al., "High Rate Codes That Are Linear in Space and Time," Lucent Technologies, 2002, pp. 1-55.
Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.
Iserte, P., et al., "Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.
Jongren, G. et al.: "Utilizing Quantized Feedback Information in Orthogonal Space-Time Block Coding," 2000 IEEE Global Telecommunications Conference, 2(4): 995-999, Nov. 27, 2000.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Lebrun G., et al., "MIMO transmission over a time varying TDD channel using SVD," Electronics Letters, 2001, vol. 37, pp. 1363-1364.
Li, Ye et. al., "Simplified Channel Estimation for OFDM Systems with Multiple Transmit Antennas," IEEE Transactions on Wireless Communications, Jan. 2002, vol. 1, No. 1, pp. 67-75.
Miyashita, K. et al: "High data-rate transmission with eigenbeam-space division multiplexing (E-SDM) in a MIMO channel," VTC 2002-Fall. 2002 IEEE 56TH. Vehicular Technology Conference Proceedings. Vancouver, Canada, Sept. 24-28, 2002, IEEE Vehicular Technology Conference, New York, NY: IEEE, US, vol. 1 of 4. Conf. 56, (Sep. 24, 2002), pp. 1302-1306, XP010608639.
Office Action dated Aug. 13, 2008 for Australian Application Serial No. 2004223374, 2 pages.
Office Action dated Jun. 27, 2008 for Chinese Application Serial No. 200480011307.6, 3 pages.
Strang Gilbert:. "Linear Algebra and Its Applications," Second Edition, Academic Press, 1980.
Taiwanese Search report—TW092129777—TIPO—Mar. 6, 2010.
The Authoritative Dictionary of IEEE Standards Terms, Seventh Edition, IEEE Press: New York (Dec. 2000), p. 902.
Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.
Wolniansky, P.W.; Foschini, G.J.; Golden, G.D.; Valenzuela, R.A.; , "V-Blast: an architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.
Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.
Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.
Wyglinski Physical Layer Loading Algorithms for Indoor Wireless Multicarrier Systems, p. 109 Nov. 2004.
Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Partial European Search Report—EP10012069—Search Authority—The Hague—Nov. 29, 2011 (030121EPD1).
Song, Bong-Gee et al., "Prefilter design using the singular value decomposition for MIMO equalization," 1996 Conference Record of the Thirtieth Asilornar Conference on Signals, Systems and Computers, vol, 1, pp. 34-38, Nov. 3-6, 1996, XP010231388, DOI : 10.1109/ACSSC.1996.600812, p. 35, col. 2, paragraph 4 through p. 36, col. 1.
Supplementary European Search Report—EP06759443—Search Authority—Hague—Nov. 24, 2011 (050283EP).
Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.

* cited by examiner

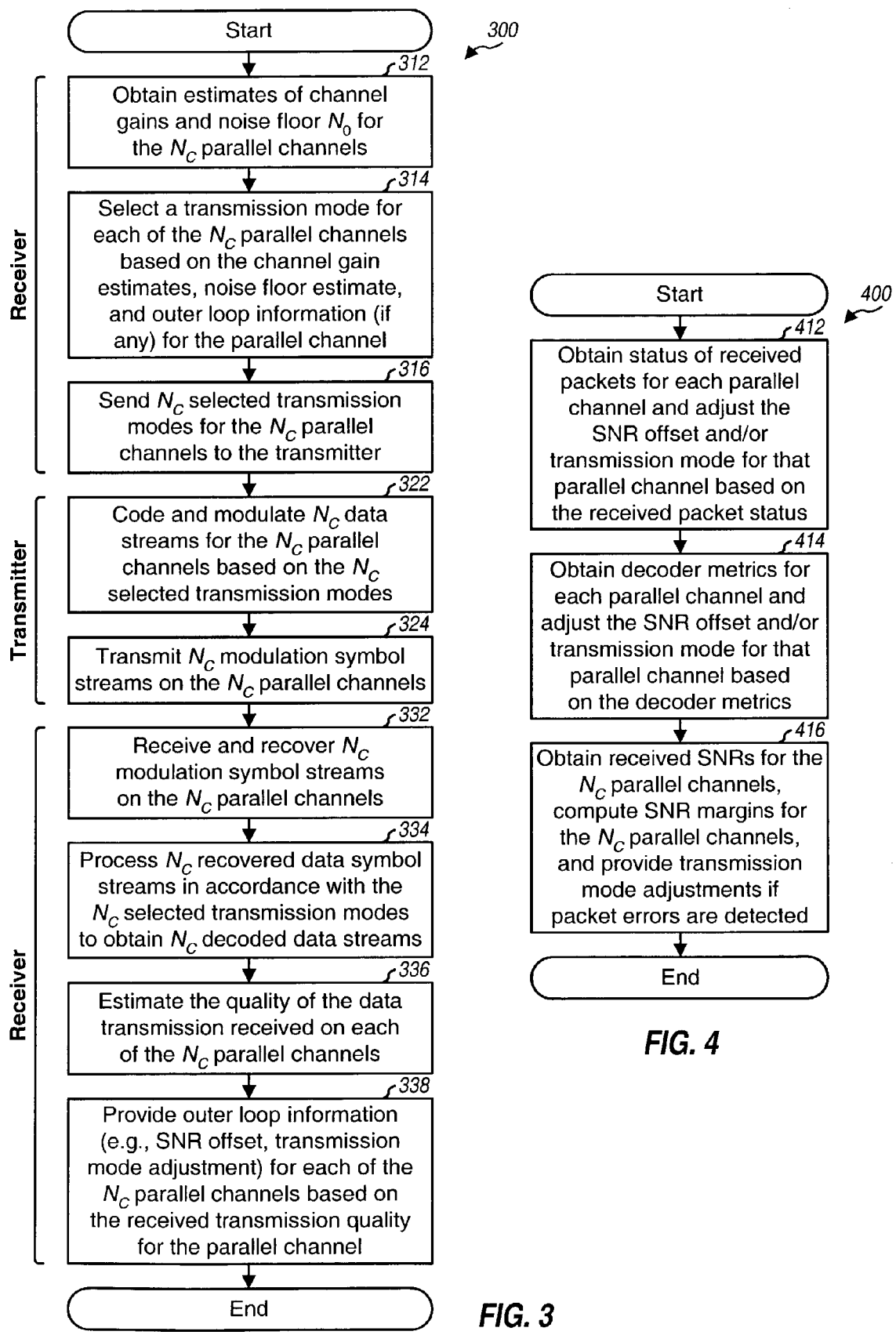

CLOSED-LOOP RATE CONTROL FOR A MULTI-CHANNEL COMMUNICATION SYSTEM

CLAIM OF PRIORITY UNDER 35 U.S.C. §119

The present Application for Patent claims priority to Provisional Application No. 60/421,309 entitled "MIMO WLAN System" filed Oct. 25, 2002, and assigned to the assignee hereof and hereby expressly incorporated by reference herein.

BACKGROUND

I. Field

The present invention relates generally to data communication, and more specifically to techniques for performing rate control for data transmission on multiple parallel channels in a multi-channel communication system.

II. Background

A multi-channel communication system utilizes multiple "parallel channels" for data transmission. These parallel channels may be formed in the time domain, frequency domain, spatial domain, or a combination thereof. For example, the multiple parallel channels may be formed by different time slots in a time division multiplex (TDM) communication system, different frequency subbands in a frequency division multiplex (FDM) communication system, different disjoint sets of subbands in an orthogonal frequency division multiplex (OFDM) communication system, or different spatial channels in a multiple-input multiple-output (MIMO) communication system. TDM, FDM, OFDM, and MIMO systems are described in further detail below.

The multiple parallel channels may experience different channel conditions (e.g., different fading, multipath, and interference effects) and may achieve different signal-to-noise ratios (SNRs). The SNR of a parallel channel determines its transmission capability, which is typically quantified by a particular data rate that may be reliably transmitted on the parallel channel. If the SNR varies from parallel channel to parallel channel, then the supported data rate would also vary from channel to channel. Moreover, since the channel conditions typically vary with time, the data rates supported by the multiple parallel channels also vary with time.

Rate control is a major challenge in a multi-channel communication system that experiences continually varying channel conditions. Rate control entails controlling the data rate of each of the multiple parallel channels based on the channel conditions. The goal of the rate control should be to maximize the overall throughput on the multiple parallel channels while meeting certain quality objectives, which may be quantified by a particular packet error rate (PER) or some other criterion.

There is therefore a need in the art for techniques to effectively perform rate control for multiple parallel channels having varying SNRs.

SUMMARY

Techniques for performing closed-loop rate control for data transmission on multiple parallel channels are described herein. Closed-loop rate control may be achieved with one or multiple loops. An inner loop estimates the channel conditions for a communication link and selects a suitable data rate for each of the multiple parallel channels (e.g., to achieve high overall throughput). An outer loop (which is optional) estimates the quality of the data transmissions received on the multiple parallel channels and adjusts the operation of the inner loop.

For the inner loop, channel estimates are initially obtained for the multiple parallel channels (e.g., based on received pilot symbols). The channel estimates may include channel gain estimates for multiple subbands of each parallel channel, an estimate of the noise floor at the receiver, and so on. A suitable "transmission mode" is then selected for each parallel channel based on (1) the transmit power allocated to the parallel channel, (2) the channel estimates for the parallel channel, (3) an SNR offset provided by the outer loop for the parallel channel, and (4) other information provided by the outer loop. A transmission mode indicates, among other things, a specific data rate to use for a parallel channel. The SNR offset indicates the amount of back-off to use for the parallel channel and influences the selection of the transmission mode for the parallel channel. The other information from the outer loop may direct the inner loop to select a transmission mode with a data rate lower than that normally selected for the parallel channel, for example, if excessive packet errors are received for the parallel channel. The transmitter and receiver process data for each parallel channel in accordance with the transmission mode selected for that parallel channel.

For the outer loop, the receiver estimates the quality of the data transmissions received via the multiple parallel channels. For example, the receiver may determine the status of each received data packet (e.g., as good or bad, as described below), obtain decoder metrics for each data stream, estimate the received SNR for each parallel channel, and so on. The outer loop then adjusts the operation of the inner loop for each parallel channel based on the estimated received quality for that parallel channel. For example, the outer loop may adjust the SNR offset for each parallel channel to achieve a target packet error rate (PER) for that parallel channel. The outer loop may also direct the inner loop to select a transmission mode with a lower data rate for a parallel channel if excessive packet errors are detected for that parallel channel.

Various aspects and embodiments of the invention are also described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 3 shows an exemplary process to transmit $N_C$ data streams on $N_C$ parallel channels using $N_C$ transmission modes selected with closed-loop rate control;

FIG. 4 shows an exemplary process for the outer loop;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

As used herein, "rate control" entails controlling the data rate of each of multiple parallel channels based on channel conditions. The data rate for each parallel channel is determined by the transmission mode selected for use for that parallel channel. Rate control may thus be achieved by controlling the transmission modes used for the multiple parallel channels.

Figure 1:
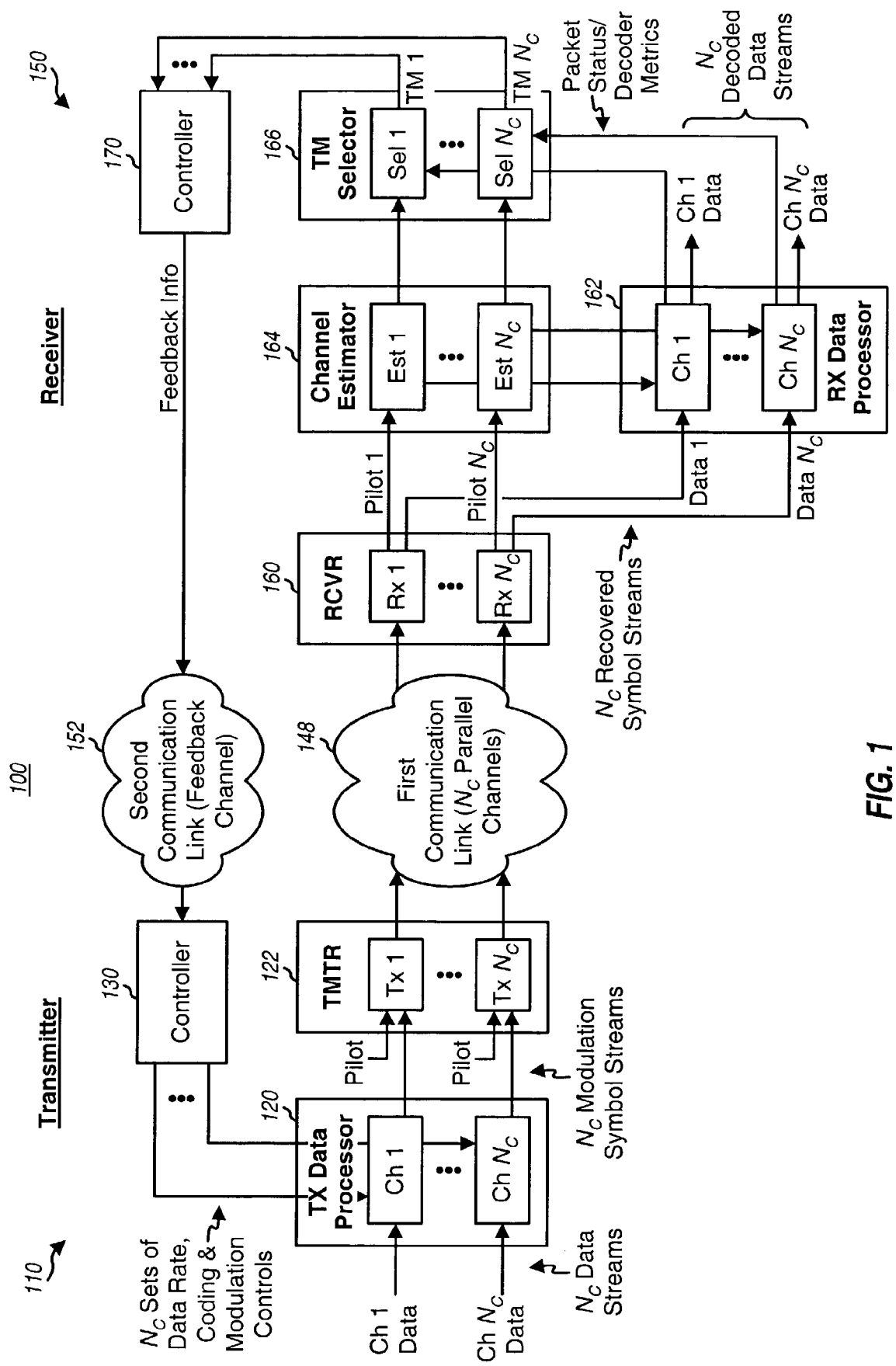
FIG. 1 shows a transmitter and a receiver in a multi-channel communication system with closed-loop rate control for $N_C$ parallel channels.

FIG. 1 shows a block diagram of a transmitter 110 and a receiver 150 in a multi-channel communication system 100 with closed-loop rate control for $N_C$ parallel channels, where $N_C > 1$. The $N_C$ parallel channels may be formed in various manners, as described below. For downlink transmission, transmitter 110 is an access point, receiver 150 is a user terminal, first communication link 148 is the downlink (i.e., forward link), and second communication link 152 is the uplink (i.e., reverse link). For uplink transmission, transmitter 110 is a user terminal, receiver 150 is an access point, and the first and second communication links are the uplink and downlink, respectively.

At transmitter 110, a transmit (TX) data processor 120 receives $N_C$ data streams, one stream for each of the $N_C$ parallel channels. Each parallel channel is associated with a specific transmission mode that indicates a set of transmission parameters to use for that parallel channel. A transmission mode may indicate (or may be associated with) a particular data rate, a particular coding scheme or code rate, a particular interleaving scheme, a particular modulation scheme, and so on, to use for data transmission. An exemplary set of transmission modes is given in Table 2 below. For each parallel channel, the data rate is indicated by a data rate control, the coding scheme is indicated by a coding control, and the modulation scheme is indicated by a modulation control. These controls are provided by a controller 130 and are generated based on the transmission mode selected for each parallel channel using feedback information obtained from receiver 150 and possibly other information (e.g., channel estimates) obtained by transmitter 10.

TX data processor 120 codes, interleaves, and modulates each data stream in accordance with the transmission mode selected for its parallel channel to provide a corresponding stream of modulation symbols. TX data processor 120 provides $N_C$ modulation symbol streams for the $N_C$ data streams. A transmitter unit (TMTR) 122 then processes the $N_C$ modulation symbol streams in a manner specified by the system. For example, transmitter unit 122 may perform OFDM processing for an OFDM system, spatial processing for a MIMO system, or both spatial and OFDM processing for a MIMO-OFDM system (which is a MIMO system that utilizes OFDM). A pilot is also transmitted to assist receiver 150 in performing a number of functions such as channel estimation, acquisition, frequency and timing synchronization, coherent demodulation, and so on. Transmitter unit 122 multiplexes pilot symbols with the modulation symbols for each parallel channel, processes the multiplexed symbols, and provides a modulated signal for each antenna used for data transmission. Each modulated signal is then transmitted via first communication link 148 to receiver 150. First communication link 148 distorts each modulated signal with a particular channel response and further degrades the modulated signal with (1) additive white Gaussian noise (AWGN) having a variance of $N_0$ and (2) possibly interference from other transmitters.

At receiver 150, the transmitted signal(s) are received by one or more receive antennas, and the received signal from each antenna is provided to a receiver unit (RCVR) 160. Receiver unit 160 conditions and digitizes each received signal to provide a corresponding stream of samples. Receiver unit 160 further processes the samples in a manner that is complementary to that performed by transmitter unit 122 to provide $N_C$ streams of "recovered" symbols, which are estimates of the $N_C$ streams of modulation symbols sent by transmitter 110.

A receive (RX) data processor 162 then processes the $N_C$ recovered symbol streams in accordance with the $N_C$ transmission modes selected for the $N_C$ parallel channels to obtain $N_C$ decoded data streams, which are estimates of the $N_C$ data streams sent by transmitter 110. The processing by RX data processor 162 may include demodulation, deinterleaving, and decoding. RX data processor 162 may further provide the status of each received data packet and/or decoder metrics for each decoded data stream.

Receiver unit 160 also provides received pilot symbols for the $N_C$ parallel channels to a channel estimator 164. Channel estimator 164 processes these received pilot symbols to obtain channel estimates for the $N_C$ parallel channels. The channel estimates may include, for example, channel gain estimates, noise variance $N_0$ estimate, and so on. The noise variance $N_0$, which is the noise floor observed at receiver 150, includes channel noise, receiver circuitry noise, interference (i.e., cross-talk) from other transmitting entities, and so on.

A transmission mode (TM) selector 166 receives the channel estimates from channel estimator 164 and possibly packet status and/or decoder metrics from RX data processor 162. Transmission mode selector 166 computes an operating SNR for each of the $N_C$ parallel channels based on the channel estimates and an SNR offset for that parallel channel. Transmission mode selector 166 then selects a suitable transmission mode for each parallel channel based on the operating SNR and outer loop information for the parallel channel. The transmission mode selection is described in detail below.

A controller 170 receives the $N_C$ selected transmission modes, TM 1 through TM $N_C$, from transmission mode selector 166 and the packet status from RX data processor 162 (not shown). Controller 170 then assembles feedback information for transmitter 110. The feedback information may include the $N_C$ selected transmission modes for the $N_C$ parallel channels, acknowledgments (ACKs) and/or negative acknowledgments (NAKs) for received data packets, a pilot, and/or other information. The feedback information is then sent via second communication link 152 to transmitter 110. Transmitter 110 uses the feedback information to adjust the processing of the $N_C$ data streams sent to receiver 150. For example, transmitter 110 may adjust the data rate, the coding scheme, the modulation scheme, or any combination thereof, for each of the $N_C$ data streams sent on the $N_C$ parallel channels to receiver 150. The feedback information is used to increase the efficiency of the system by allowing data to be transmitted at the best-known settings supported by first communication link 148.

In the embodiment shown in FIG. 1, the channel estimation and transmission mode selection are performed by receiver 150 and the $N_C$ transmission modes selected for the $N_C$ parallel channels are sent back to transmitter 110. In other embodiments, the channel estimation and transmission mode selection may be performed (1) by transmitter 110 based on feedback information obtained from receiver 150 and/or other information obtained by transmitter 110 or (2) jointly by both transmitter 110 and receiver 150.

Figure 2:
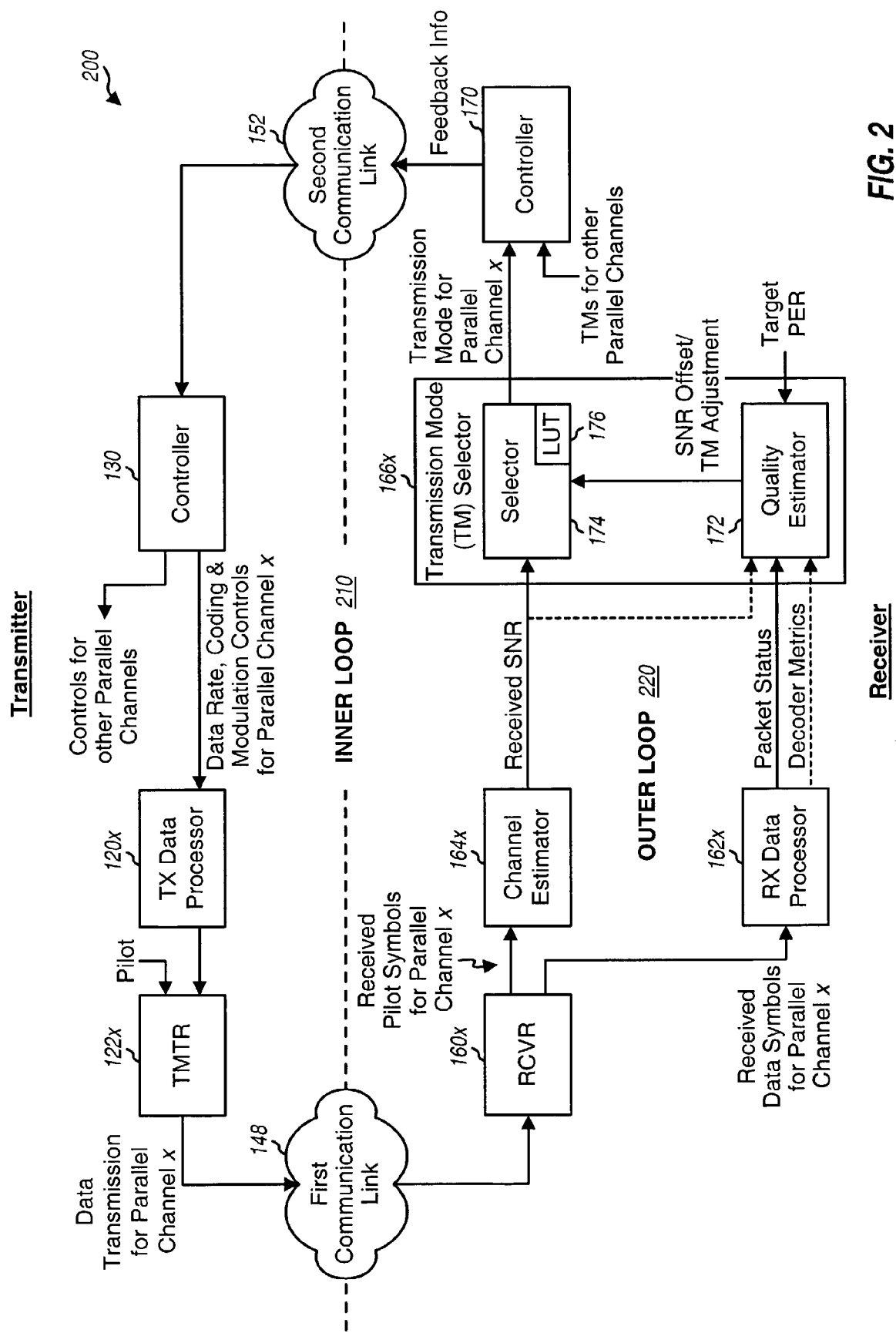
FIG. 2 shows a closed-loop rate control mechanism.

FIG. 2 shows a block diagram of an embodiment of a closed-loop rate control mechanism 200, which includes an inner loop 210 that operates in conjunction with an outer loop 220. For simplicity, the operation of inner loop 210 and outer loop 220 for only one parallel channel x is shown in FIG. 2. In general, the same processing may be performed independently for each of the $N_C$ parallel channels.

For inner loop 210, channel estimator 164x estimates the channel conditions for parallel channel x and provides channel estimates (e.g., channel gain estimates and noise floor estimate). A selector 174 within transmission mode selector 166x computes a received SNR for parallel channel x based on (1) the channel estimates from channel estimator 164x and (2) an SNR offset and/or a transmission mode adjustment for parallel channel x from a quality estimator 172. For clarity, the received SNR is symbolically shown as being provided by channel estimator 164x to selector 174 in FIG. 2. Selector 174 then selects a transmission mode for parallel channel x based on the received information, as described below. The select transmission mode for parallel channel x is included in the feedback information sent by controller 170 to the transmitter. At the transmitter, controller 130 receives the selected transmission mode for parallel channel x and determines the data rate, coding, and modulation controls for parallel channel x. Data is then processed in accordance with these controls by TX data processor 120x, further multiplexed with pilot symbols and conditioned by transmitter unit 122x, and sent to the receiver. The channel estimation and transmission mode selection may be performed periodically, at scheduled times, whenever changes in the communication link are detected, only as necessary (e.g., prior to and during data transmission), or at other times.

Outer loop 220 estimates quality of the data transmission received on parallel channel x and adjusts the operation of inner loop 210 for parallel channel x. The received data symbols for parallel channel x are processed by RX data processor 162x, and the status of each received packet on parallel channel x and/or decoder metrics are provided to quality estimator 172. The decoder metrics may include a re-encoded symbol error rate (SER), a re-encoded power metric, a modified Yamamoto metric (for a convolutional decoder), minimum or average log-likelihood ratio (LLR) among bits in a decoded packet (for a Turbo decoder), and so on. The re-encoded SER is the error rate between the received symbols from receiver unit 160 and the re-encoded symbols obtained by processing (e.g., re-encoding, re-modulating, and so on) the decoded data from RX data processor 162. The modified Yamamoto metric is indicative of the confidence in the decoded data and is obtained based on the difference between the selected (best) path through the trellis for the convolutional decoding and the next closest path through the trellis. The minimum or average LLR may also be used as an indication of the confidence of the decoded data. These decoder metrics, which are indicative of the quality of the data transmission received on parallel channel x, are known in the art.

Outer loop 220 can provide different types of information used to control the operation of inner loop 210. For example, outer loop 220 can provide an SNR offset for each parallel channel. The SNR offset is used in the computation of the operating SNR for the parallel channel, as described below. The operating SNR is then provided to a look-up table (LUT) 176 and used to select the transmission mode for the parallel channel. The SNR offset thus influences the selection of the transmission mode. Outer loop 220 can also provide a transmission mode adjustment for each parallel channel. This adjustment may direct inner loop 210 to select a transmission mode with a lower data rate for the parallel channel. The transmission mode adjustment directly impacts the selection of the transmission mode. The SNR offset and transmission mode adjustment are two mechanisms for controlling the operation of inner loop 210. Outer loop 220 may also be designed to provide other types of adjustments for inner loop 210. For simplicity, only the SNR offset and transmission mode adjustment are described below. Outer loop 220 may adjust the SNR offset and/or transmission mode in various manners, some of which are described below.

In a first embodiment, the SNR offset and/or transmission mode for each parallel channel are adjusted based on packet errors detected for the data stream received on that parallel channel. The data stream may be transmitted in packets, blocks, frames, or some other data units. (For simplicity, packet is used herein for the data unit.) Each packet may be coded with an error detection code (e.g., a cyclic redundancy check (CRC) code) that allows the receiver to determine whether the packet was decoded correctly or in error. Each parallel channel may be associated with a particular target packet error rate (PER) (e.g., 1% PER). Quality estimator 172 receives the status of each received packet and the target PER for parallel channel x and adjusts the SNR offset for parallel channel x accordingly. For example, the SNR offset for parallel channel x may be initialized to zero at the start of data transmission on parallel channel x. The SNR offset may thereafter be reduced by $\Delta DN$ for each good packet and increased by $\Delta UP$ for each bad packet, where $\Delta DN$ and $\Delta UP$ may be selected based on the target PER and the desired response time for the outer loop. The SNR offset is typically a positive value or zero but may also be allowed to be a negative value (e.g., to account for a high initial estimate of the received SNR). Alternatively or additionally, quality estimator 172 may provide a directive to adjust the transmission mode for parallel channel x to the next lower data rate, for example, if a burst of packet errors is detected on parallel channel x. The SNR offset and/or transmission mode adjustment from quality estimator 172 are used by selector 174 to select the transmission mode for parallel channel x.

In a second embodiment, the SNR offset and/or transmission mode for each parallel channel are adjusted based on the decoder metrics for that parallel channel. The decoder metrics for each parallel channel can be used to estimate the quality of the data transmission received on that parallel channel. If a particular decoder metric for a given parallel channel is worse than a threshold selected for that metric, then the SNR offset and/or transmission mode for that parallel channel may be adjusted accordingly.

In a third embodiment, the SNR offset and/or transmission mode for each parallel channel are adjusted based on the received SNR and the required SNR for that parallel channel. The received SNR for each parallel channel may be determined based on the received pilot symbols for that parallel channel. The system may support a set of transmission modes (e.g., as shown in Table 2), and each supported transmission mode requires a different minimum SNR to achieve the target PER. Quality estimator 172 can determine an SNR margin for parallel channel x, which is the difference between the received SNR and the required SNR for parallel channel x. If the SNR margin for parallel channel x is a negative value, then the transmission mode for parallel channel x may be adjusted to the next lower data rate.

The third embodiment may also be used for a design whereby a packet is demultiplexed and transmitted across multiple parallel channels. If the packet is received in error, then it may not be possible to determine (just from the received packet) which one or ones of the parallel channels cause the packet to be received in error. If no other information is available, then it may be necessary to adjust the $N_C$ SNR offsets and/or the $N_C$ transmission modes for all $N_C$ parallel channels, for example, so that the next lower data rate is used for each parallel channel. This may result in an excessive amount of reduction on the overall data rate. However, using the third embodiment, the parallel channel with the smallest SNR margin can be assumed to have caused the packet error, and the transmission mode for this parallel channel can be adjusted to the next lower data rate.

The outer loop may also adjust the operation of the inner loop in other manners, and this is within the scope of the invention. In general, the outer loop operates at a rate that may be faster or slower than the rate of the inner loop. For example, the adjustment of the SNR offset by the outer loop may be dependent on many received packets. The outer loop can also adjust the data rate in between regularly scheduled inner loop calculations. Thus, depending on its specific design and manner of operation, the outer loop typically has more influence on the operation of the inner loop for longer data transmissions. For bursty transmissions, the outer loop may not have much or any influence on the operation of the inner loop.

FIG. 3 shows a flow diagram of a process 300 to transmit $N_C$ data streams on $N_C$ parallel channels using $N_C$ transmission modes selected with closed-loop rate control. Process 300 may be implemented as shown in FIGS. 1 and 2. Initially, the receiver estimates the channel gains and the noise floor $N_0$ for the $N_C$ parallel channels (step 312). The receiver then selects a transmission mode for each of the $N_C$ parallel channels based on the channel gain estimates, the noise floor estimate, and outer loop information (if any) for that parallel channel (step 314). The outer loop information may include the SNR offset and/or transmission mode adjustment for each of the $N_C$ parallel channels. The transmission mode selection is described below. The receiver sends the $N_C$ selected transmission modes for the $N_C$ parallel channels, as feedback information, to the transmitter (step 316).

The transmitter codes and modulates the $N_C$ data streams in accordance with the $N_C$ selected transmission modes (obtained from the receiver) to provide $N_C$ modulation symbol streams (step 322). The transmitter then processes and transmits the $N_C$ modulation symbol streams on the $N_C$ parallel channels to the receiver (step 324).

The receiver processes the data transmissions received on the $N_C$ parallel channels from the transmitter and obtains $N_C$ recovered symbol streams (step 332). The receiver further processes the $N_C$ recovered symbol streams in accordance with the $N_C$ selected transmission modes to obtain $N_C$ decoded data streams (step 334). The receiver also estimates the quality of the data transmission received on each of the $N_C$ parallel channels, e.g., based on the packet status, decoder metrics, received SNRs, and so on (step 336). The receiver then provides outer loop information for each of the $N_C$ parallel channels based on the estimated quality for the data transmission received on that parallel channel (step 338). In FIG. 3, steps 312 through 324 may be considered as part of the inner loop, and steps 332 through 338 may be considered as part of the outer loop.

FIG. 4 shows a flow diagram of a process 400 that may be performed for the outer loop. The status of data packets received on each of the $N_C$ parallel channels is obtained and used to adjust the SNR offset and/or transmission mode for that parallel channel (step 412). Decoder metrics for each of the $N_C$ parallel channels may also be obtained and used to adjust the SNR offset and/or transmission mode for that parallel channel (step 414). The received SNR for each of the $N_C$ parallel channels may also be obtained for each parallel channel and used to compute the SNR margin for that parallel channel. The SNR margins for the $N_C$ parallel channels may be used to adjust the transmission modes for the parallel channels if packet errors are detected (step 416). An outer loop may implement any one or any combination of the steps shown in FIG. 4, depending on its specific design.

The closed-loop rate control techniques described herein may be used for various types of multi-channel communication systems having multiple parallel channels that may be used for data transmission. For example, these techniques may be used for TDM systems, FDM systems, OFDM-based systems, MIMO systems, MIMO systems that utilize OFDM (i.e., MIMO-OFDM systems), and so on.

A TDM system may transmit data in frames, each of which may be of a particular time duration. Each frame may include multiple ($N_{TS}$) slots that may be assigned different slot indices. $N_C$ parallel channels may be formed by the $N_{TS}$ slots in each frame, where $N_C \leq N_{TS}$. Each of the $N_C$ parallel channels may include one or multiple slots. The $N_C$ channels are considered "parallel" even though they are not transmitted simultaneously.

An FDM system may transmit data in ($N_{SB}$) frequency subbands, which may be arbitrarily spaced. $N_C$ parallel channels may be formed by the $N_{SB}$ subbands, where $N_C \leq N_{SB}$. Each of the $N_C$ parallel channels may include one or multiple subbands.

An OFDM system uses OFDM to effectively partition the overall system bandwidth into multiple ($N_F$) orthogonal subbands, which may also be referred to as tones, bins, and frequency channels. Each subband is associated with a respective carrier that may be modulated with data. $N_C$ parallel channels may be formed by the $N_F$ subbands, where $N_C \leq N_F$. The $N_C$ parallel channels are formed by $N_C$ disjoints sets of one or more subbands. The $N_C$ sets are disjoint in that each of the $N_F$ subbands is assigned to only one set (and thus to one parallel channel), if at all. An OFDM system may be considered as a specific type of FDM system.

A MIMO system employs multiple ($N_T$) transmit antennas and multiple ($N_R$) receive antennas for data transmission, and is denoted as an ($N_T$, $N_R$) system. A MIMO channel formed by the $N_T$ transmit and $N_R$ receive antennas is composed of $N_S$ spatial channels that may be used for data transmission, where $N_S \leq \min\{N_T, N_R\}$. The number of spatial channels is determined by a channel response matrix $\underline{H}$ that describes the response between the $N_T$ transmit and $N_R$ receive antennas. For simplicity, the following description assumes that the channel response matrix $\underline{H}$ is full rank. In this case, the number of spatial channels is given as $N_S = N_T \leq N_R$. $N_C$ parallel channels may be formed by the $N_S$ spatial channels, where $N_C \leq N_S$. Each of the $N_C$ parallel channels may include one or multiple spatial channels.

A MIMO-OFDM system has $N_S$ spatial channels for each of $N_F$ subbands. $N_C$ parallel channels may be formed by the $N_S$ spatial channels of each of the $N_F$ subbands, where $N_C \leq N_F \cdot N_S$. Each of the $N_C$ parallel channels may include one or multiple spatial channels of one or multiple subbands (i.e., any combination of spatial channels and subbands). For MIMO and MIMO-OFDM systems, $N_C$ parallel channels may also be formed by the $N_T$ transmit antennas, where $N_C \leq N_T$. Each of the $N_C$ parallel channels may be associated with one or multiple transmit antennas for data transmission.

For MIMO and MIMO-OFDM systems, data may be transmitted on the $N_S$ spatial channels in various manners. For a partial channel state information (partial-CSI) MIMO system, data is transmitted on the $N_S$ spatial channels without any spatial processing at the transmitter and with spatial processing at the receiver. For a full-CSI MIMO system, data is transmitted on the $N_S$ spatial channels with spatial processing at both the transmitter and the receiver. For the full-CSI MIMO system, eigenvalue decomposition or singular value decomposition may be performed on the channel response matrix $\underline{H}$ to obtain $N_S$ "eigenmodes" of the MIMO channel. Data is transmitted on the $N_S$ eigenmodes, which are orthogonalized spatial channels.

The closed-loop rate control techniques described herein may be used for time division duplex (TDD) systems as well as frequency division duplex (FDD) systems. For a TDD system, the downlink and uplink share the same frequency band and are likely to observe similar fading and multipath effects. Thus, the channel response for each link may be estimated based on a pilot received on either that link or the other link. For an FDD system, the downlink and uplink use different frequency bands and are likely to observe different fading and multipath effects. The channel response for each link may be estimated based on a pilot received on that link.

The closed-loop rate control techniques may be used for both partial-CSI and full-CSI MIMO systems. These techniques may also be used for the downlink as well as the uplink.

The closed-loop rate control techniques are now described in detail for an exemplary multi-channel communication system, which is a full-CSI TDD MIMO-OFDM system. For simplicity, in the following description, the term "eigenmode" and "wideband eigenmode" are used to denote the case where an attempt is made to orthogonalize the spatial channels, even though it may not be fully successful due to, for example, an imperfect channel estimate.

I. TDD MIMO-OFDM System

Figure 5:
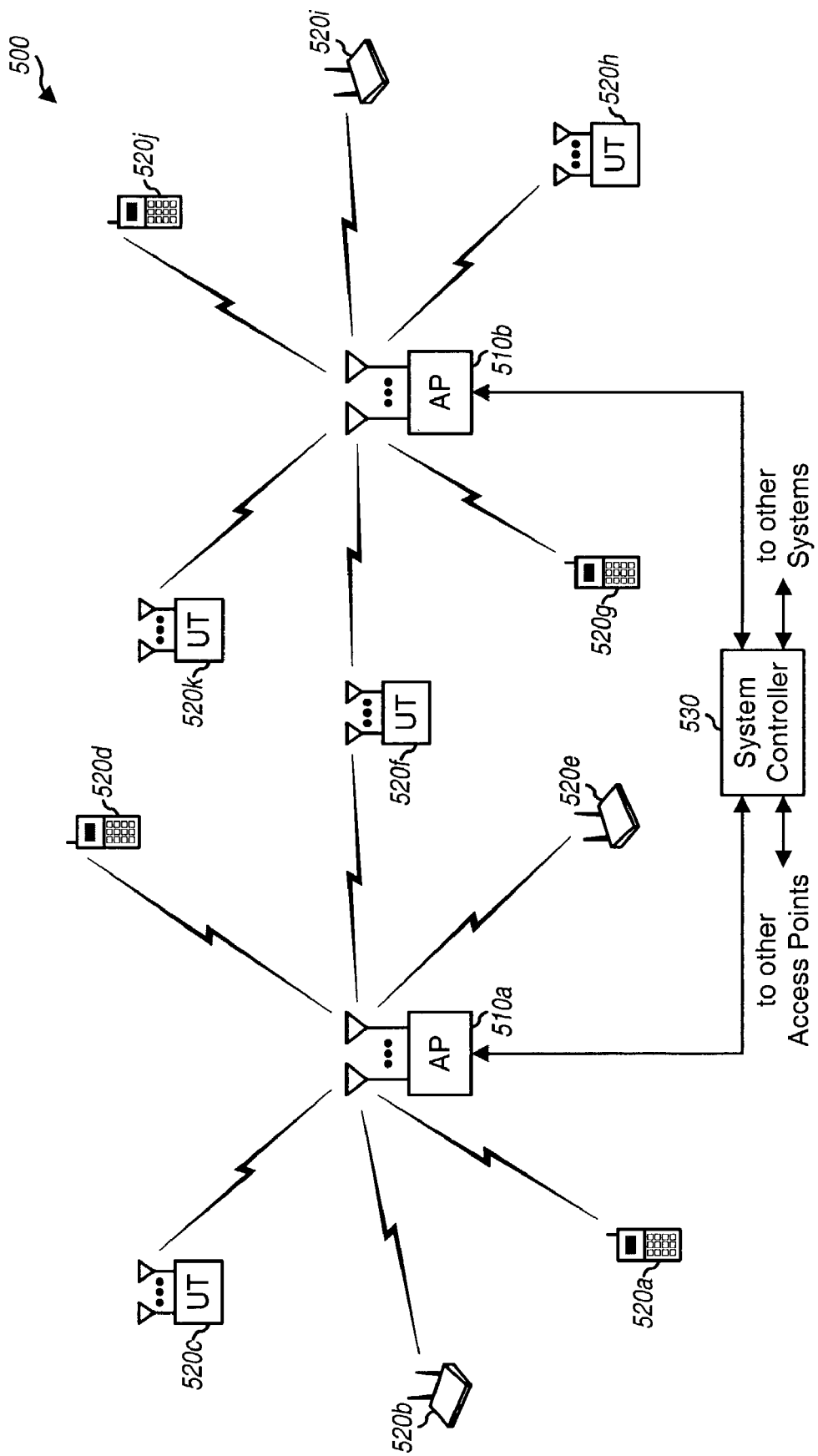
FIG. 5 shows an exemplary TDD MIMO-OFDM system.

FIG. 5 shows an exemplary TDD MIMO-OFDM system 500 with a number of access points (APs) 510 that support communication for a number of user terminals (UTs) 520. For simplicity, only two access points 510a and 510b are shown in FIG. 5. An access point may also be referred to as a base station, a base transceiver system, a Node B, or some other terminology. A user terminal may be fixed or mobile, and may also be referred to as an access terminal, a mobile station, a user equipment (UE), a wireless device, or some other terminology. Each user terminal may communicate with one or possibly multiple access points on the downlink and/or the uplink at any given moment. A system controller 530 couples to access points 510 and provides coordination and control for these access points.

Figure 6:
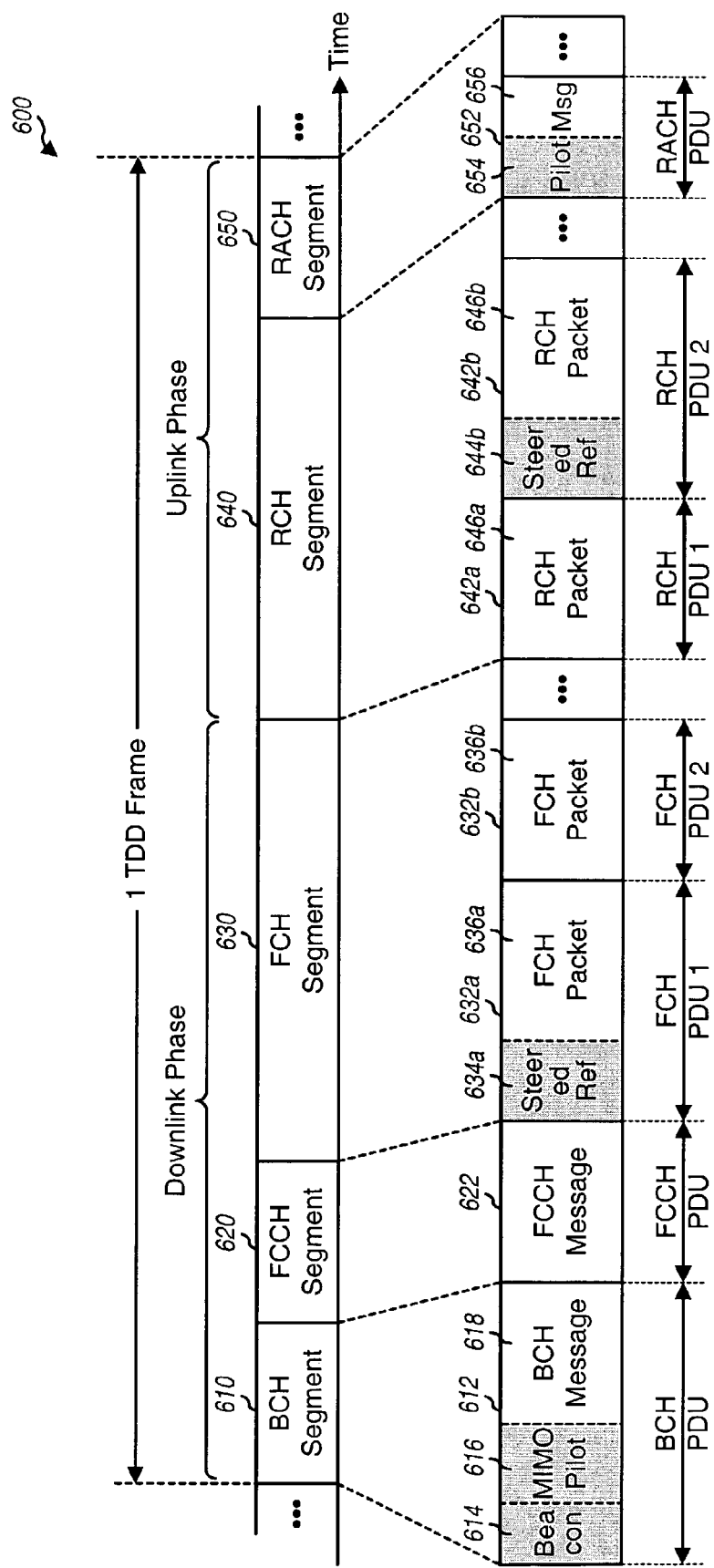
FIG. 6 shows a frame structure used in the TDD MIMO-OFDM system.

FIG. 6 shows an exemplary frame structure 600 that may be used in TDD MIMO-OFDM system 500. Data transmission occurs in units of TDD frames, each of which spans a particular time duration (e.g., 2 msec). Each TDD frame is partitioned into a downlink phase and an uplink phase, and each phase is further partitioned into multiple segments for multiple transport channels. In the embodiment shown in FIG. 6, the downlink transport channels include a broadcast channel (BCH), a forward control channel (FCCH), and a forward channel (FCH), and the uplink transport channels include a reverse channel (RCH) and a random access channel (RACH).

In the downlink phase, a BCH segment 610 is used to transmit one BCH protocol data unit (PDU) 612, which includes a beacon pilot 614, a MIMO pilot 616, and a BCH message 618. The beacon pilot is a pilot transmitted from all antennas and is used for timing and frequency acquisition. The MIMO pilot is a pilot transmitted from all antennas but with a different orthogonal code for each antenna in order to allow the user terminals to individually identify the antennas. The MIMO pilot is used for channel estimation. The BCH message carries system parameters for the user terminals. An FCCH segment 620 is used to transmit one FCCH PDU, which carries assignments for downlink and uplink resources (e.g., the selected transmission modes for the downlink and uplink) and other signaling for the user terminals. An FCH segment 630 is used to transmit one or more FCH PDUs 632 on the downlink. Different types of FCH PDU may be defined. For example, an FCH PDU 632a includes a steered reference 634a and a data packet 636a, and an FCH PDU 632b includes only a data packet 636b. The steered reference is a pilot that is transmitted on a specific wideband eigenmode (as described below) and is used for channel estimation.

In the uplink phase, an RCH segment 640 is used to transmit one or more RCH PDUs 642 on the uplink. Different types of RCH PDU may also be defined. For example, an RCH PDU 642a includes only a data packet 646a, and an RCH PDU 642b includes a steered reference 644b and a data packet 646b. An RACH segment 650 is used by the user terminals to gain access to the system and to send short messages on the uplink. An RACH PDU 652 may be sent in RACH segment 650 and includes a pilot (e.g., steered reference) 654 and a message 656.

FIG. 6 shows an exemplary frame structure for a TDD system. Other frame structures may also be used, and this is within the scope of the invention.

1. Spatial Processing

For a MIMO-OFDM system, the channel response between an access point and a user terminal may be characterized by a set of channel response matrices, $\underline{H}(k)$ for $k \in K$, where K represents the set of all subbands of interest (e.g., $K = \{1, \ldots, N_F\}$). For a TDD MIMO-OFDM system with a shared frequency band, the downlink and uplink channel responses may be assumed to be reciprocal of one another. That is, if $\underline{H}(k)$ represents a channel response matrix from antenna array A to antenna array B for subband k, then a reciprocal channel implies that the coupling from array B to array A is given by $\underline{H}^T(k)$, where $\underline{A}^T$ denotes the transpose of $\underline{A}$.

However, the frequency responses of the transmit and receive chains at the access point are typically different from the frequency responses of the transmit and receive chains at the user terminal. Calibration may be performed to obtain correction matrices used to account for differences in the frequency responses. With these correction matrices, the "calibrated" downlink channel response, $\underline{H}_{cdn}(k)$, observed by the user terminal is the transpose of the "calibrated" uplink channel response, $\underline{H}_{cup}(k)$, observed by the access point, i.e., $\underline{H}_{cdn}(k) = \underline{H}_{cup}^T(k)$, for $k \in K$. For simplicity, the following description assumes that the downlink and uplink channel responses are calibrated and reciprocal of one another.

On the downlink, a MIMO pilot may be transmitted by the access point (e.g., in BCH segment 610) and used by the user terminal to obtain an estimate of the calibrated downlink channel response, $\hat{\underline{H}}_{cup}(k)$, for $k \in K$. The user terminal may estimate the calibrated uplink channel response as $\underline{\hat{H}}_{cup}(k)=\underline{\hat{H}}_{cdn}^T(k)$. The user terminal may perform singular value decomposition of $\underline{\hat{H}}_{cup}(k)$, for each subband k, as follows:

$$\underline{\hat{H}}_{cup}(k)=\underline{\hat{U}}_{ap}(k)\underline{\hat{\Sigma}}(k)\underline{\hat{V}}_{ut}^H(k), \text{ for } k\in K, \quad \text{Eq (1)}$$

where $\underline{\hat{U}}_{ap}(k)$ is an ($N_{ap} \times N_{ap}$) unitary matrix of left eigenvectors of $\underline{\hat{H}}_{cup}(k)$;

$\underline{\hat{\Sigma}}(k)$ is an ($N_{ap} \times N_{ut}$) diagonal matrix of singular values of $\underline{\hat{H}}_{cup}(k)$;

$\underline{\hat{V}}_{ut}(k)$ is an ($N_{ut} \times N_{ut}$) unitary matrix of right eigenvectors of $\underline{\hat{H}}_{cup}(k)$;

$\underline{A}^H$ is the conjugate transpose of $\underline{A}$;

$N_{ap}$ is the number of antennas at the access point; and $N_{ut}$ is the number of antennas at the user terminal.

Similarly, the singular value decomposition of $\underline{\hat{H}}_{cdn}(k)$ may be expressed as:

$$\underline{\hat{H}}_{cdn}(k)=\underline{\hat{V}}_{ut}^*(k)\underline{\hat{\Sigma}}(k)\underline{\hat{U}}_{ap}^T(k), \text{ for } k\in K, \quad \text{Eq (2)}$$

where $\underline{\hat{V}}_{ut}^*(k)$ and $\underline{\hat{U}}_{ap}^*(k)$ are unitary matrices of left and right eigenvectors, respectively, of $\underline{\hat{H}}_{cdn}(k)$ and "*" denotes the complex conjugate. Singular value decomposition is described by Gilbert Strang in a book entitled "Linear Algebra and Its Applications," Second Edition, Academic Press, 1980.

As shown in equations (1) and (2), the matrices of left and right eigenvectors for one link are the complex conjugate of the matrices of right and left eigenvectors, respectively, for the other link. The matrices $\underline{\hat{U}}_{ap}(k)$ and $\underline{\hat{V}}_{ut}(k)$ may be used by the access point and the user terminal, respectively, for spatial processing and are denoted as such by their subscripts. The matrix $\underline{\hat{\Sigma}}(k)$ includes singular value estimates that represent the gains for the spatial channels (or eigenmodes) of the channel response matrix $\underline{H}(k)$ for each subband k.

Singular value decomposition may be performed independently for the channel response matrix $\underline{\hat{H}}_{cup}(k)$ for each subband k to determine the $N_S$ eigenmodes of that subband. The singular value estimates for each diagonal matrix $\underline{\hat{\Sigma}}(k)$ may be ordered such that $\{\hat{\sigma}_1(k) \geq \hat{\sigma}_2(k) \geq \ldots \geq \hat{\sigma}_{N_S}(k)\}$, where $\hat{\sigma}_1(k)$ is the largest singular value estimate and $\hat{\sigma}_{N_S}(k)$ is the smallest singular value estimate for subband k. When the singular value estimates for each diagonal matrix $\underline{\hat{\Sigma}}(k)$ are ordered, the eigenvectors (or columns) of the associated matrices $\underline{\hat{U}}(k)$ and $\underline{\hat{V}}(k)$ are also ordered correspondingly. A "wideband eigenmode" may be defined as the set of same-order eigenmodes of all subbands after the ordering. Thus, the m-th wideband eigenmode includes the m-th eigenmodes of all subbands. The "principal" wideband eigenmode is the one associated with the largest singular value estimate in the matrix $\underline{\hat{\Sigma}}(k)$ for each of the subbands. $N_S$ parallel channels may be formed by the $N_S$ wideband eigenmodes.

The user terminal may transmit a steered reference on the uplink (e.g., in RCH segment 640 or RACH segment 650 in FIG. 6). The uplink steered reference for wideband eigenmode m may be expressed as:

$$\underline{x}_{up,sr,m}(k)=\underline{\hat{v}}_{ut,m}(k)p(k), \text{ for } k\in K, \quad \text{Eq (3)}$$

where $\underline{x}_{up,sr,m}(k)$ is a vector of $N_{ut}$ symbols sent from $N_{ut}$ user terminal antennas for subband k of wideband eigenmode m for the steered reference;

$\underline{\hat{v}}_{ut,m}(k)$ is the m-th column of the matrix $\underline{\hat{V}}_{ut}(k)$ for subband k, where $\underline{\hat{V}}_{ut}(k)=[\underline{\hat{v}}_{ut,1}(k)\underline{\hat{v}}_{ut,2}(k) \ldots \underline{\hat{v}}_{ut,N_{ut}}(k)]$; and p(k) is the pilot symbol sent on subband k.

The steered reference for all $N_S$ wideband eigenmodes may be transmitted in $N_S$ OFDM symbol periods, or fewer than $N_S$ OFDM symbol periods using subband multiplexing. The steered reference for each wideband eigenmode may also be transmitted over multiple OFDM symbol periods.

The received uplink steered reference at the access point may be expressed as:

$$\underline{r}_{up,sr,m}(k) = \underline{H}_{cup}(k)\underline{\hat{v}}_{ut,m}(k)\,p(k) + \underline{n}_{up}(k) \quad \text{Eq (4)}$$
$$\approx \underline{\hat{u}}_{ap,m}(k)\hat{\sigma}_m(k)\,p(k) + \underline{n}_{up}(k), \text{ for } k \in K,$$

where $\underline{r}_{up,sr,m}(k)$ is a vector of $N_{ap}$ symbols received on $N_{ap}$ access point antennas for subband k of wideband eigenmode m for the steered reference;

$\underline{\hat{u}}_{ap,m}(k)$ is the m-th column of the matrix $\underline{\hat{U}}_{ap}(k)$ for subband k, where $\underline{\hat{U}}_{ap}(k)=[\underline{\hat{u}}_{ap,1}(k)\underline{\hat{u}}_{ap,2}(k) \ldots \underline{\hat{u}}_{ap,N_{ap}}(k)]$;

$\hat{\sigma}_m(k)$ is the singular value estimate for subband k of wideband eigenmode m, i.e., the m-th diagonal element of the matrix $\underline{\hat{\Sigma}}(k)$; and $\underline{n}_{up}(k)$ is additive white Gaussian noise (AWGN) for subband k on the uplink.

As shown in equation (4), at the access point, the received steered reference (in the absence of noise) is approximately $\underline{\hat{u}}_{ap,m}(k)\hat{\sigma}_m(k)p(k)$. The access point can thus obtain estimates of both $\underline{\hat{u}}_{ap,m}(k)$ and $\hat{\sigma}_m(k)$ for each subband k based on the received steered reference for that subband. The estimate of $\hat{\sigma}_m(k)$ for subband k of wideband eigenmode m, $\hat{\hat{\sigma}}_m(k)$, may be expressed as:

$$\hat{\hat{\sigma}}_m(k) = \|\underline{r}_{up,sr,m}(k)\|^2 = \sum_{i=1}^{N_{ap}} |r_{up,sr,m,i}(k)|^2, \quad \text{Eq (5)}$$

for $k \in K$ and $m \in M$, where $\|\underline{a}\|$ denotes the 2-norm of $\underline{a}$;

$r_{up,sr,m,i}(k)$ is the i-th element of the vector $\underline{r}_{up,sr,m}(k)$; and M represents the set of all wideband eigenmodes of interest, e.g., $M=\{1, \ldots, N_S\}$.

The estimate of $\underline{\hat{u}}_{ap,m}(k)$ for subband k of wideband eigenmode m, $\underline{\hat{\hat{u}}}_{ap,m}(k)$, may be expressed as:

$$\underline{\hat{\hat{u}}}_{ap,m}(k)=\underline{r}_{up,sr,m}(k)/\hat{\hat{\sigma}}_m(k), \text{ for } k\in K \text{ and } m\in M. \quad \text{Eq (6)}$$

The double hat for $\underline{\hat{\hat{u}}}_{ap,m}(k)$ and $\hat{\hat{\sigma}}_m(k)$ indicates that these are estimates of estimates, i.e., estimates obtained by the access point for the estimates $\underline{\hat{u}}_{ap,m}(k)$ and $\hat{\sigma}_m(k)$ obtained by the user terminal. If the steered reference for each wideband eigenmode is transmitted over multiple OFDM symbol periods, then the access point can average the received steered reference for each wideband eigenmode to obtain more accurate estimates of $\underline{\hat{u}}_{ap,m}(k)$ and $\hat{\sigma}_m(k)$.

Table 1 summarizes the spatial processing at the access point and the user terminal for data transmission and reception on multiple wideband eigenmodes.

TABLE 1

| | Downlink | Uplink |
|---|---|---|
| Access Point | Transmit: $\underline{x}_{dn}(k) = \hat{\underline{U}}_{ap}^*(k)\underline{s}_{dn}(k)$ | Receive: $\hat{\underline{s}}_{up}(k) = \hat{\underline{\Sigma}}^{-1}(k)\hat{\underline{U}}_{ap}^H(k)\underline{r}_{up}(k)$ |
| User Terminal | Receive: $\hat{\underline{s}}_{dn}(k) = \hat{\underline{\Sigma}}^{-1}(k)\hat{\underline{V}}_{ut}^T(k)\underline{r}_{dn}(k)$ | Transmit: $\underline{x}_{up}(k) = \hat{\underline{V}}_{ut}(k)\underline{s}_{up}(k)$ |

In Table 1, $\underline{s}(k)$ is a "data" vector of modulation symbols (obtained from the symbol mapping at the transmitter), $\underline{x}(k)$ is a "transmit" vector of transmit symbols (obtained after spatial processing at the transmitter), $\underline{r}(k)$ is a "received" vector of received symbols (obtained after OFDM processing at the receiver), and $\hat{\underline{s}}(k)$ is an estimate of the vector $\underline{s}(k)$ (obtained after spatial processing at the receiver), where all of the vectors are for subband k. The subscripts "dn" and "up" for these vectors denote downlink and uplink, respectively. In Table 1, $\underline{\Sigma}^{-1}(k)$ is a diagonal matrix defined as $\underline{\Sigma}^{-1}(k)=\text{diag }(1/\sigma_1(k)\ 1/\sigma_2(k)\ \ldots\ 1/\sigma_{N_S}(k))$.

The steered reference may be transmitted for one wideband eigenmode at a time by the user terminal or may be transmitted for multiple wideband eigenmodes simultaneously using an orthogonal basis (e.g., Walsh codes). The steered reference for each wideband eigenmode may be used by the access point to obtain $\hat{\underline{u}}_{ap,m}(k)$, for $k \in K$, for that wideband eigenmode. If the $N_S$ vectors $\hat{\underline{u}}_{ap,m}(k)$ of the matrix $\hat{\underline{U}}_{ap}(k)$ are obtained individually (and over different OFDM symbol periods) for the $N_S$ eigenmodes of each subband, then, due to noise and other sources of degradation in the wireless link, the $N_S$ vectors $\hat{\underline{u}}_{ap,m}(k)$ of the matrix $\hat{\underline{U}}_{ap}(k)$ for each subband k are not likely to be orthogonal to one another. In this case, the $N_S$ vectors of the matrix $\hat{\underline{U}}_{ap}(k)$ for each subband k may be orthogonalized using QR factorization, polar decomposition, or some other techniques.

At the access point, a received SNR estimate for subband k of wideband eigenmode m, $\gamma_{ap,m}(k)$, may be expressed as:

$$\gamma_{ap,m}(k) = \frac{P_{up,m}(k) \cdot \hat{\sigma}_m^2(k)}{N_{0,ap}}, \text{ for } k \in K \text{ and } m \in M, \quad \text{Eq (7)}$$

where $P_{up,m}(k)$ is the transmit power used by the user terminal for subband k of wideband eigenmode m on the uplink; and
$N_{0,ap}$ is the noise floor at the access point.

At the user terminal, a received SNR estimate for subband k of wideband eigenmode m, $\gamma_{ut,m}(k)$, may be expressed as:

$$\gamma_{ut,m}(k) = \frac{P_{dn,m}(k) \cdot \hat{\sigma}_m^2(k)}{N_{0,ut}}, \text{ for } k \in K \text{ and } m \in M, \quad \text{Eq (8)}$$

where $P_{dn,m}(k)$ is the transmit power used by the access point for subband k of wideband eigenmode m on the downlink; and
$N_{0,ut}$ is the noise floor at the user terminal.

As shown in equations (7) and (8), the received SNR for each subband of each wideband eigenmode, $\gamma_m(k)$, is dependent on the channel gain (which is $\hat{\sigma}_m(k)$ or $\hat{\sigma}_m(k)$), the receiver noise floor $N_0$, and the transmit power $P_m(k)$. The received SNR may be different for different subbands and eigenmodes.

Figure 7:
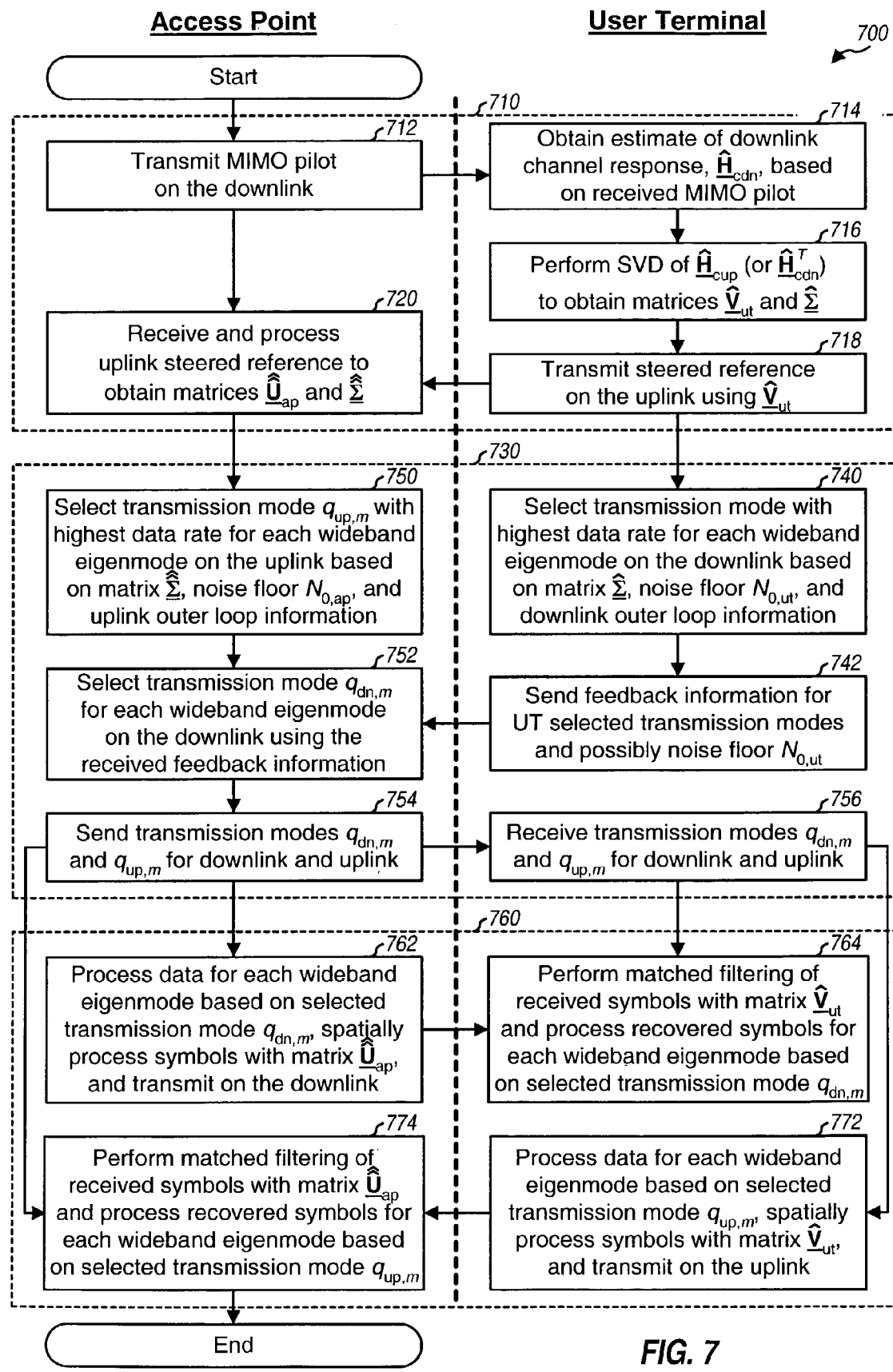
FIG. 7 shows a process for transmitting multiple data streams on multiple wideband eigenmodes on the downlink and uplink in the TDD MIMO-OFDM system.

FIG. 7 shows a flow diagram of a process 700 for transmitting multiple data streams on multiple wideband eigenmodes on the downlink and uplink in the exemplary TDD MIMO-OFDM system. Process 700 assumes that calibration has already been performed and that the downlink and uplink channel responses are transpose of one another, i.e., $\hat{\underline{H}}_{cup}(k) \approx \hat{\underline{H}}_{cdn}^T(k)$. For process 700, channel estimation is performed in block 710, transmission mode selection is performed in block 730, and data transmission/reception is performed in block 760.

For channel estimation, the access point transmits a MIMO pilot on the downlink (e.g., on the BCH) (step 712). The user terminal receives and processes the MIMO pilot to obtain an estimate of the calibrated downlink channel response, $\hat{\underline{H}}_{cdn}(k)$, for $k \in K$ (step 714). The user terminal then estimates the calibrated uplink channel response as $\hat{\underline{H}}_{cup}(k) = \hat{\underline{H}}_{cdn}^T(k)$ and performs singular value decomposition (SVD) of $\hat{\underline{H}}_{cup}(k)$ to obtain the matrices $\hat{\underline{\Sigma}}(k)$ and $\hat{\underline{V}}_{ut}(k)$, for $k \in K$, as shown in equation (1) (step 716). The user terminal then transmits an uplink steered reference (e.g., on the RACH or the RCH) using the matrices $\hat{\underline{V}}_{ut}(k)$, for $k \in K$, as shown in equation (3) (step 718). The access point receives and processes the uplink steered reference to obtain the matrices $\hat{\underline{\Sigma}}(k)$ and $\hat{\underline{U}}_{ap}(k)$, for $k \in K$, as described above (step 720).

For downlink data transmission, the user terminal selects a transmission mode (with the highest supported data rate) for each wideband eigenmode on the downlink based on the diagonal matrix $\hat{\underline{\Sigma}}(k)$, the noise floor $N_{O,ut}$ at the user terminal, and downlink outer loop information (e.g., SNR offsets and/or transmission mode adjustments for the downlink) (step 740). The transmission mode selection is described below. The user terminal then sends feedback information, which includes the $N_S$ transmission modes selected by the user terminal for the downlink and may further include the noise floor $N_{O,ut}$ at the user terminal (step 742). (The steered reference transmitted in step 718 may also be viewed as feedback information sent by the user terminal.)

For uplink data transmission, the access point selects $N_S$ transmission modes for the $N_S$ wideband eigenmodes on the uplink based on the diagonal matrix $\hat{\underline{\Sigma}}(k)$, the noise floor $N_{0,ap}$ at the access point, and uplink outer loop information (e.g., SNR offsets and/or transmission mode adjustments for the uplink) (step 750). The access point further selects the $N_S$ transmission modes for the $N_S$ wideband eigenmodes on the downlink based on the feedback information received from the user terminal (step 752). The access point then sends the selected transmission modes for both the downlink and uplink (e.g., on the FCCH) (step 754). The user terminal receives the selected transmission modes for both links (step 756).

For downlink data transmission, the access point (1) codes and modulates the data for each downlink wideband eigenmode in accordance with the transmission mode selected for that wideband eigenmode, (2) spatially processes the data vector $\underline{s}_{dn}(k)$ with the matrix $\hat{\underline{U}}_{ap}^{*}(k)$, as shown in Table 1, to obtain the transmit vector $\underline{x}_{dn}(k)$, for $k \in K$, and (3) transmits the vector $\underline{x}_{dn}(k)$ on the downlink (step 762). The user terminal (1) receives the downlink transmission, (2) performs matched filtering on the received vector $\underline{r}_{dn}(k)$ with $\hat{\underline{\Sigma}}^{-1}(k) \hat{\underline{V}}_{ut}^{T}(k)$, as also shown in Table 1, to obtain the vector $\hat{\underline{s}}_{dn}(k)$, for $k \in K$, and (3) demodulates and decodes the recovered symbols in accordance with the transmission mode selected for each downlink wideband eigenmode (step 764).

For uplink data transmission, the user terminal (1) codes and modulates the data for each uplink wideband eigenmode in accordance with the transmission mode selected for that wideband eigenmode, (2) spatially processes the data vector $\underline{s}_{up}(k)$ with the matrix $\hat{\underline{V}}_{ut}(k)$ to obtain the transmit vector $\underline{x}_{up}(k)$, for $k \in K$, and (3) transmits the vector $\underline{x}_{up}(k)$ on the uplink (step 772). The access point (1) receives the uplink transmission, (2) performs matched filtering on the received vector $\underline{r}_{up}(k)$ with $\hat{\underline{\Sigma}}^{-1}(k) \hat{\underline{U}}_{ap}^{H}(k)$ to obtain the vector $\hat{\underline{s}}_{up}(k)$, and (3) demodulates and decodes the recovered symbols in accordance with the transmission mode selected for each uplink wideband eigenmode (step 774). For simplicity, the closed-loop operation and the transmission mode adjustment by the outer loop are not shown in FIG. 7.

FIG. 7 shows a specific embodiment of a process that may be used for downlink and uplink data transmission in the exemplary TDD MIMO-OFDM system. Other processes may also be implemented whereby the channel estimation, transmission mode selection, and/or data transmission/reception may be performed in some other manners.

2. Transmission Mode Selection

Figure 8:
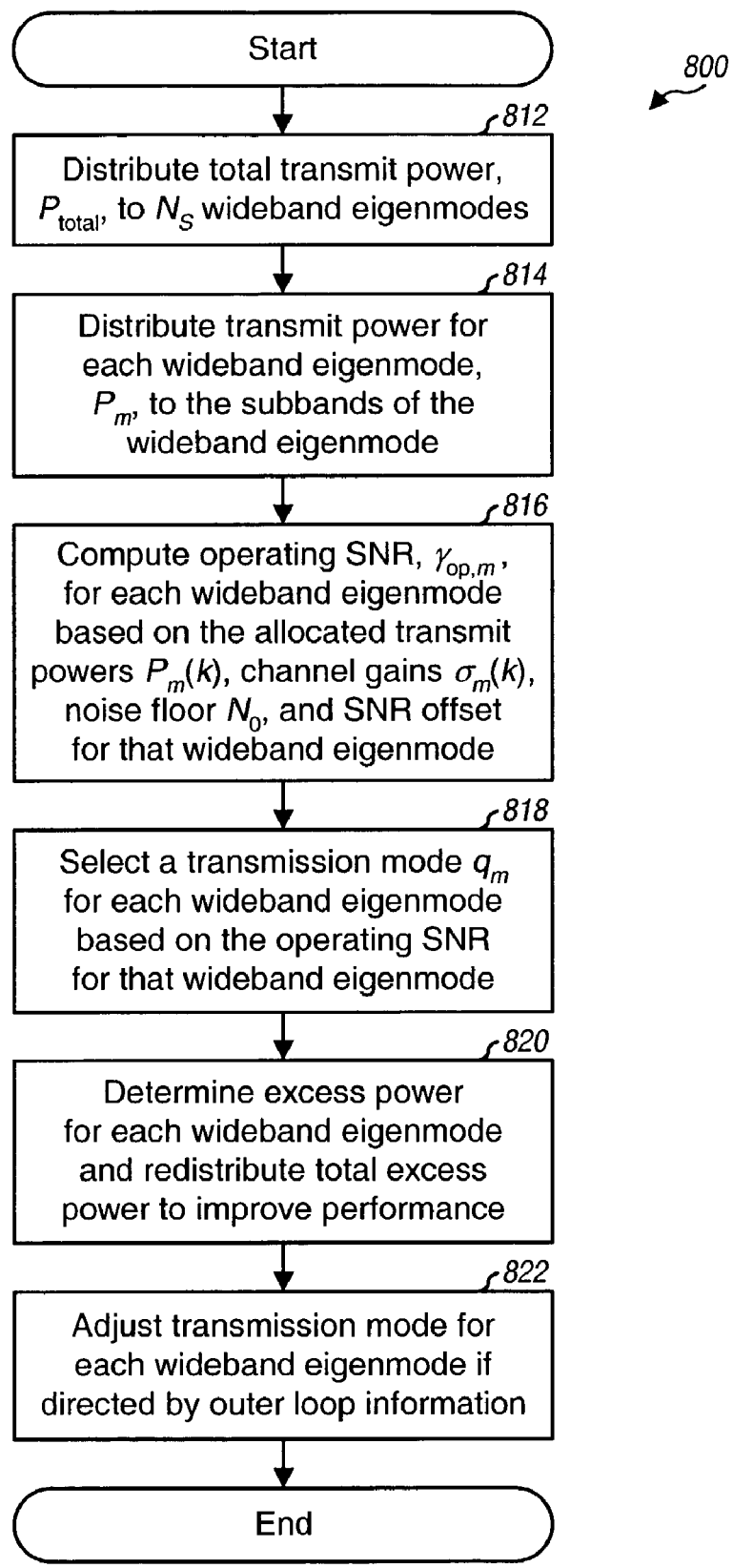
FIG. 8 shows a process for selecting $N_S$ transmission modes for $N_S$ wideband eigenmodes.

FIG. 8 shows a flow diagram of a process 800 for selecting $N_S$ transmission modes for the $N_S$ wideband eigenmodes. Process 800 may be used for steps 740 and 750 in FIG. 7. Initially, the total transmit power, $P_{total}$, available at the transmitter for data transmission is distributed to the $N_S$ wideband eigenmodes based on a power distribution scheme (step 812). The transmit power $P_m$ allocated to each wideband eigenmode is then distributed to the $N_F$ subbands of that wideband eigenmode based on the same or a different power distribution scheme (step 814). The power distribution across the $N_S$ wideband eigenmodes and the power distribution across the $N_F$ subbands of each wideband eigenmode may be performed as described below.

An operating SNR for each wideband eigenmode, $\gamma_{op,m}$, is computed based on (1) the allocated transmit powers $P_m(k)$ and the channel gains $\sigma_m(k)$ for the subbands of that wideband eigenmode, (2) the noise floor $N_0$ at the receiver, and (3) the SNR offset for that wideband eigenmode (step 816). The computation of the operating SNR is described below. A suitable transmission mode $q_m$ is then selected for each wideband eigenmode based on the operating SNR for that wideband eigenmode and a look-up table (step 818). Excess power for each wideband eigenmode is determined, and the total excess power for all wideband eigenmodes is redistributed to one or more wideband eigenmodes to improve performance (step 820). The transmission mode for each wideband eigenmode may be adjusted (e.g., to the next lower data rate) if directed by outer loop information (step 822). Each of the steps in FIG. 8 is described in detail below.

A. Power Distribution Across Wideband Eigenmodes

For step 812 in FIG. 8, the total transmit power, $P_{total}$, may be distributed to the $N_S$ wideband eigenmodes using various schemes. Some of these power distribution schemes are described below.

In a uniform power distribution scheme, the total transmit power, $P_{total}$, is distributed uniformly across the $N_S$ wideband eigenmodes such that they are all allocated equal power. The transmit power $P_m$ allocated to each wideband eigenmode m may be expressed as:

$$P_m = \frac{P_{total}}{N_S}, \text{ for } m \in M. \quad \text{Eq (9)}$$

In a water-filling power distribution scheme, the total transmit power, $P_{total}$, is distributed to the $N_S$ wideband eigenmodes based on a "water-filling" or "water-pouring" procedure. The water-filling procedure distributes the total transmit power, $P_{total}$, across the $N_S$ wideband eigenmodes such that the overall spectral efficiency is maximized. Water-filling is described by Robert G. Gallager in "Information Theory and Reliable Communication," John Wiley and Sons, 1968. The water-filling for the $N_S$ wideband eigenmodes may be performed in various manners, some of which are described below.

In a first embodiment, the total transmit power, $P_{total}$, is initially distributed to the $N_S N_F$ subbands/eigenmodes using water-filling and based on their received SNRs, $\gamma_m(k)$, for $k \in K$ and $m \in M$. The received SNR, $\gamma_m(k)$, may be computed as shown in equation (7) or (8) with the assumption of $P_{total}$ being uniformly distributed across the $N_S N_F$ subbands/eigenmodes. The result of this power distribution is an initial transmit power, $P_m'(k)$, for each subband/eigenmode. The transmit power $P_m$ allocated to each wideband eigenmode is then obtained by summing the initial transmit powers, $P_m'(k)$, allocated to the $N_F$ subbands of that wideband eigenmode, as follows:

$$P_m = \sum_{k=1}^{N_F} P_m'(k), \text{ for } m \in M. \quad \text{Eq (10)}$$

In a second embodiment, the total transmit power, $P_{total}$, is distributed to the $N_S$ wideband eigenmodes based on the average SNRs computed for these wideband eigenmodes. Initially, the average SNR, $\gamma_{avg,m}$, is computed for each wideband eigenmode m based on the received SNRs for the $N_F$ subbands of that wideband eigenmode, as follows:

$$\gamma_{avg,m} = \frac{1}{N_F} \sum_{k=1}^{N_F} \gamma_m(k), \quad \text{Eq (11)}$$

where $\gamma_m(k)$ is computed as described above for the first embodiment. Water-filling is then performed to distribute the total transmit power, $P_{total}$, across the $N_S$ wideband eigenmodes based on their average SNRs, $\gamma_{avg,m}$, for $m \in M$.

In a third embodiment, the total transmit power, $P_{total}$, is distributed to the $N_S$ wideband eigenmodes based on the average SNRs for these wideband eigenmodes after channel inversion is applied for each wideband eigenmode. For this embodiment, the total transmit power, $P_{total}$, is first distributed uniformly to the $N_S$ wideband eigenmodes. Channel inversion is then performed (as described below) independently for each wideband eigenmode to determine an initial power allocation, $P_m''(k)$, for each subband of that wideband eigenmode. After the channel inversion, the received SNR is the same across all subbands of each wideband eigenmode. The average SNR for each wideband eigenmode is then equal to the received SNR for any one of the subbands of that wideband eigenmode. The received SNR, $\gamma_m''(k)$, for one subband of each wideband eigenmode can be determined based on the initial power allocation, $P_m''(k)$, as shown in equation (7) or (8). The total transmit power, $P_{total}$, is then distributed to the $N_S$ wideband eigenmodes using water-filling and based on their average SNRs, $\gamma_{avg,m}''$, for $m \in M$.

Other schemes may also be used to distribute the total transmit power to the $N_S$ wideband eigenmodes, and this is within the scope of the invention.

B. Power Allocation Across Subbands in Each Wideband Eigenmode

For step 814 in FIG. 8, the transmit power allocated to each wideband eigenmode, $P_m$, may be distributed to the $N_F$ subbands of that wideband eigenmode using various schemes. Some of these power distribution schemes are described below.

In a uniform power distribution scheme, the transmit power for each wideband eigenmode, $P_m$, is distributed uniformly across the $N_F$ subbands such that they are all allocated equal power. The transmit power $P_m(k)$ allocated to each subband may be expressed as:

$$P_m(k) = \frac{P_m}{N_F}, \text{ for } k \in K \text{ and } m \in M. \quad \text{Eq (12)}$$

For the uniform power distribution scheme, the received SNRs for the $N_F$ subbands of each wideband eigenmode are likely to vary across the subbands.

In a channel inversion scheme, the transmit power for each wideband eigenmode, $P_m$, is distributed non-uniformly across the $N_F$ subbands such that they achieve similar received SNRs at the receiver. In the following description, $\sigma_m(k)$ denotes the estimated channel gain, which is equal to $\hat{\sigma}_m(k)$ for the downlink and $\hat{\sigma}_m(k)$ for the uplink. For the channel inversion scheme, a normalization $b_m$ is initially computed for each wideband eigenmode, as follows:

$$b_m = \frac{1}{\sum_{k=1}^{N_F}[1/\sigma_m^2(k)]}, \text{ for } m \in M. \quad \text{Eq (13)}$$

The transmit power $P_m(k)$ allocated to each subband of each wideband eigenmode may then be computed as:

$$P_m(k) = \frac{b_m \cdot P_m}{\sigma_m^2(k)}, \text{ for } k \in K \text{ and } m \in M. \quad \text{Eq (14)}$$

A transmit weight, $W_m(k)$, may be computed for each subband of each wideband eigenmode, as follows:

$$W_m(k) = \sqrt{P_m(k)}, \text{ for } k \in K \text{ and } m \in M. \quad \text{Eq (15)}$$

The transmit weights are used to scale modulation symbols at the transmitter. For the channel inversion scheme, all $N_F$ subbands are used for each wideband eigenmode and the received SNRs for the subbands are approximately equal.

In a selective channel inversion scheme, the transmit power for each wideband eigenmode, $P_m$, is distributed non-uniformly across selected ones of the $N_F$ subbands such that the selected subbands achieve similar received SNRs at the receiver. The selected subbands are those with channel gains equal to or greater than a gain threshold. For this scheme, an average power gain, $g_m$, is initially computed for each wideband eigenmode, as follows:

$$g_m = \frac{1}{N_F}\sum_{k=1}^{N_F}\sigma_m^2(k), \text{ for } m \in M. \quad \text{Eq (16)}$$

A normalization $\tilde{b}_m$ is then computed for each wideband eigenmode, as follows:

$$\tilde{b}_m = \frac{1}{\sum_{\sigma_m^2(k) \geq \beta_m g_m}[1/\sigma_m^2(k)]}, \text{ for } m \in M, \quad \text{Eq (17)}$$

where $\beta_m g_m$ is the gain threshold and $\beta_m$ is a scaling factor, which may be selected to maximize the overall throughput or based on some other criterion. The transmit power allocated to each subband of each wideband eigenmode, $P_m(k)$, may be expressed as:

$$P_m(k) = \begin{cases} \frac{\tilde{b}_m \cdot P_m}{\sigma_m^2(k)}, & \text{if } \sigma_m^2(k) \geq \beta_m g_m \\ 0, & \text{otherwise,} \end{cases} \quad \text{Eq (18)}$$

for $k \in K$ and $m \in M$.

For the selective channel inversion scheme, $N_F$ or fewer subbands may be selected for use for each wideband eigenmode and the received SNRs for the selected subbands are approximately equal.

Other schemes may also be used to distribute the transmit power $P_m$ across the $N_F$ subbands of each wideband eigenmode, and this is within the scope of the invention.

C. Transmission Mode Selection for Each Wideband Eigenmode

For step 816 in FIG. 8, an operating SNR is computed for each wideband eigenmode. The operating SNR indicates the transmission capability of the wideband eigenmode. Various methods may be used for step 816, depending on whether the received SNRs are similar or vary across the subbands of each wideband eigenmode. In the following description, SNRs are given in units of decibels (dB).

If channel inversion or selective channel inversion is performed, then the received SNRs for the subbands of each wideband eigenmode, $\gamma_m(k)$ for $k \in K$, are similar. The received SNR for subband k of wideband eigenmode m, $\gamma_m(k)$, may be computed as:

$$\gamma_m(k) = 10\log_{10}\left(\frac{P_m(k) \cdot \sigma_m^2(k)}{N_0}\right), \quad \text{Eq (19)}$$

for $k \in K$ and $m \in M$. (dB)

The operating SNR for each wideband eigenmode, $\gamma_{op,m}$, is equal to the received SNR for any one of the subbands of that wideband eigenmode minus the SNR offset for that wideband eigenmode, as follows:

$$\gamma_{op,m} = \gamma_m(k) - \gamma_{os,m}, \text{ for any } k \text{ and } m \in M, \text{ (dB)} \qquad \text{Eq (20)}$$

where $\gamma_m(k)$, $\gamma_{op,m}$ are all given in units of dB in equations (19) and (20).

If the transmit power $P_m$ for each wideband eigenmode is uniformly distributed across the subbands, then the received SNRs for the subbands of each wideband eigenmode are likely to vary. In this case, the operating SNR for each wideband eigenmode, $\gamma_{op,m}$, may be computed as:

$$\gamma_{op,m} = \gamma_{avg,m} - \gamma_{bo,m} - \gamma_{Yos,m}, \text{ (dB)} \qquad (21)$$

where $\gamma_{avg,m}$ is an average of the received SNRs for the $N_F$ subbands of wideband eigenmode m; and $\gamma_{bo,m}$ is a back-off factor that accounts for variation in the received SNRs, which may be a function of the variance of the received SNRs.

For step 818 in FIG. 8, a suitable transmission mode is selected for each wideband eigenmode based on the operating SNR for that wideband eigenmode. The system may be designed to support a set of transmission modes. The transmission mode having index 0 is for a null data rate (i.e., no data transmission). Each supported transmission mode is associated with a particular minimum SNR required to achieve the desired level of performance (e.g., 1% PER). Table 2 lists an exemplary set of 14 transmission modes supported by the system, which are identified by transmission mode indices 0 through 13. Each transmission mode is associated with a particular spectral efficiency, a particular code rate, a particular modulation scheme, and the minimum SNR required to achieve 1% PER for a non-fading, AWGN channel. The spectral efficiency refers to the data rate (i.e., the information bit rate) normalized by the system bandwidth, and is given in units of bits per second per Hertz (bps/Hz). The spectral efficiency for each transmission mode is determined by the coding scheme and the modulation scheme for that transmission mode. The code rate and modulation scheme for each transmission mode in Table 2 are specific to the exemplary system design.

TABLE 2

| Transmission Mode Index | Spectral Efficiency (bps/Hz) | Code Rate | Modulation Scheme | Required SNR (dB) |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |
| 12 | 6.0 | 3/4 | 256 QAM | 24.2 |
| 13 | 7.0 | 7/8 | 256 QAM | 26.3 |

For each supported transmission mode with a non-zero data rate, the required SNR is obtained based on the specific system design (i.e., the particular code rate, interleaving scheme, modulation scheme, and so on, used by the system for that transmission mode) and for an AWGN channel. The required SNR may be obtained by computer simulation, empirical measurements, and so on, as is known in the art. A look-up table may be used to store the set of supported transmission modes and their required SNRs.

The operating SNR for each wideband eigenmode, $\gamma_{op,m}$, may be provided to the look-up table, which then provides the transmission mode $q_m$ for that wideband eigenmode. This transmission mode $q_m$ is the supported transmission mode with the highest data rate and a required SNR, $\gamma_{req,m}$, that is less than or equal to the operating SNR (i.e., $\gamma_{req,m} \leq \gamma_{op,m}$). The look-up table thus selects the highest possible data rate for each wideband eigenmode based on the operating SNR for that wideband eigenmode.

D. Reallocation of Transmit Power

For step 820 in FIG. 8, the excess transmit power for each wideband eigenmode is determined and redistributed to improve performance. The following terms are used for the description below:

Active wideband eigenmode—a wideband eigenmode with a non-zero data rate (i.e., a transmission mode having an index from 1 through 13 in Table 2);

Saturated wideband eigenmode—a wideband eigenmode with the maximum data rate (i.e., transmission mode having index 13); and Unsaturated wideband eigenmode—an active wideband eigenmode with a non-zero data rate less than the maximum data rate (i.e., a transmission mode having an index from 1 through 12).

The operating SNR for a wideband eigenmode may be less than the smallest required SNR in the look-up table (i.e., $\gamma_{op,m} < -1.8$ dB for the transmission modes shown in Table 2). In this case, the wideband eigenmode may be shut off (i.e., not used) and the transmit power for this wideband eigenmode may be redistributed to other wideband eigenmodes.

The selected transmission mode $q_m$ for each active wideband eigenmode is associated with a required SNR, $\gamma_{req,m}$, that is equal to or lower than the operating SNR, ie., $\gamma_{req,m} \leq \gamma_{op,m}$. The minimum transmit power required for each active wideband eigenmode, $P_{req,m}$, may be computed as:

$$P_{req,m} = \frac{P_m \cdot \gamma_{req,m}}{\gamma_{op,m}}, \text{ for } m \in M. \qquad \text{Eq (22)}$$

The required transmit power is equal to zero ($P_{req,m}=0$) for each wideband eigenmode that is shut off (i.e., with transmission mode having index 0 in Table 2).

The excess power for each wideband eigenmode, $P_{excess,m}$, is the amount of allocated power that is over the minimum power needed to achieve the required SNR (i.e., $P_{excess,m} = P_m - P_{req,m}$). The total excess power for all wideband eigenmodes, $P_{excess}$, may be computed as:

$$P_{excess} = \sum_{m=1}^{N_S} (P_m - P_{req,m}). \qquad \text{Eq (23)}$$

The total excess power, $P_{excess}$, may be redistributed in various manners. For example, the total excess power, $P_{excess}$, may be redistributed to one or more wideband eigenmodes such that higher overall throughput is achieved. In one embodiment, the total excess power, $P_{excess}$, is redistributed to one unsaturated wideband eigenmode at a time, starting with the best one having the highest data rate, to move the wideband eigenmode to the next higher data rate. In another embodiment, the total excess power, $P_{excess}$, is redistributed to the wideband eigenmode that can achieve the highest increase in data rate with the least amount of transmit power.

If all wideband eigenmodes are operated at the highest data rate, or if the remaining excess power cannot increase the data rate of any wideband eigenmode, then the remaining excess power may be redistributed to one, multiple, or all active wideband eigenmodes to improve the SNR margins for these wideband eigenmodes.

E. Transmission Mode Adjustment

For step 822 in FIG. 8, the transmission mode for each wideband eigenmode may be adjusted based on information from the outer loop. The selected transmission modes for the downlink and uplink wideband eigenmodes may be adjusted using the techniques described above for FIG. 2. For example, if excessive packet errors are received on a given wideband eigenmode, then the outer loop may provide a transmission mode adjustment for that wideband eigenmode. As another example, a running average of the received SNRs may be maintained for each wideband eigenmode and used to compute the SNR margin for that wideband eigenmode. If the SNR margin for a given wideband eigenmode is negative, then the transmission mode for the wideband eigenmode may be adjusted to the next lower data rate. If a packet is transmitted across multiple wideband eigenmodes, then the transmission mode for the wideband eigenmode with the worse SNR margin may be adjusted to the next lower data rate whenever packet errors are detected. In any case, a transmission mode adjustment may direct the selection of another transmission mode with a lower data rate than the one selected in step 818.

II. MIMO-OFDM System

Figure 9A:
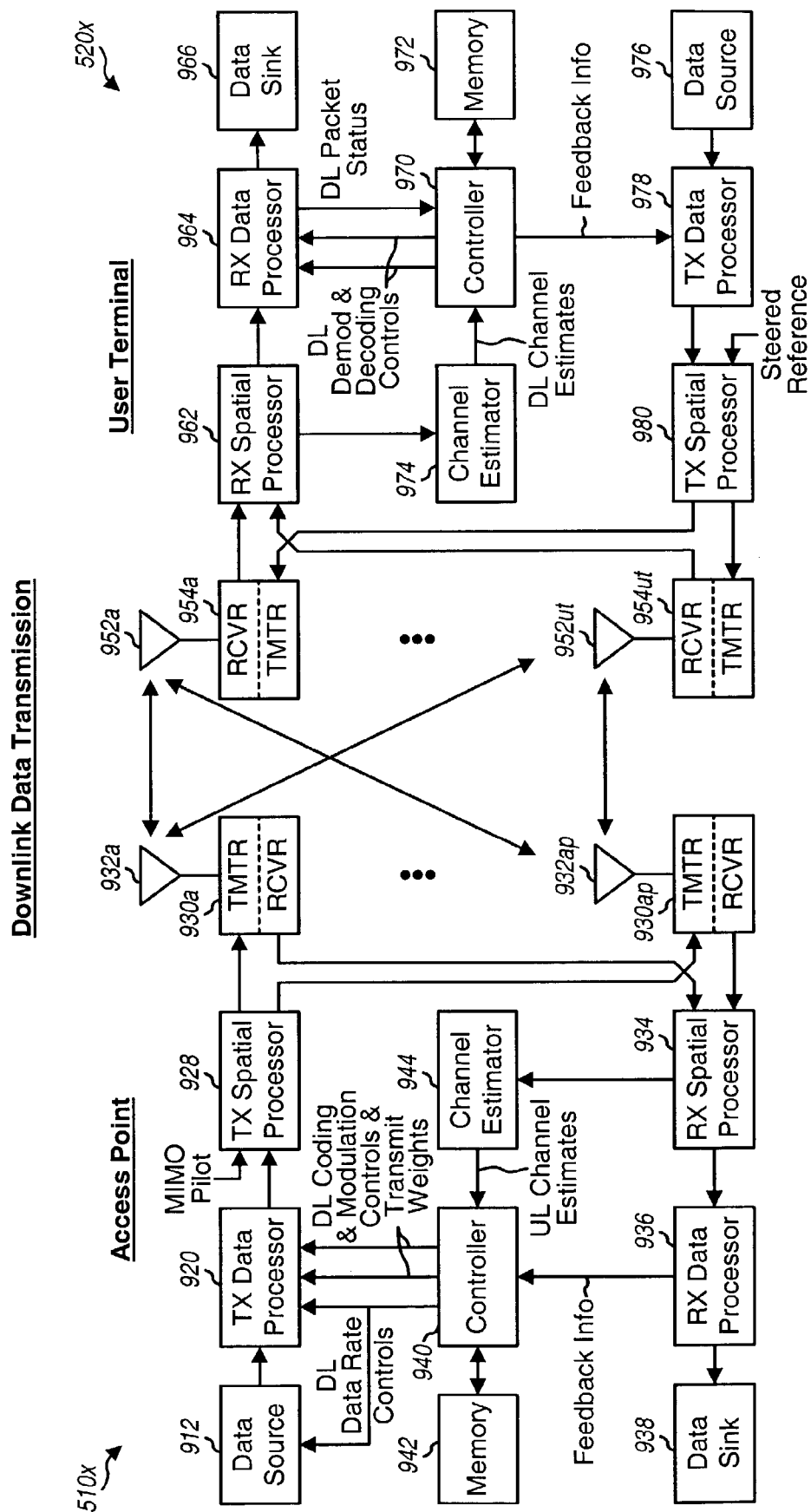
FIGS. 9A and 9B show an access point and a terminal in the TDD MIMO-OFDM system for downlink and uplink transmission, respectively.

FIG. 9A shows a block diagram of an embodiment of an access point 510x and a user terminal 520x in the exemplary TDD MIMO-OFDM system. Access point 510x is one of access points 510 in FIG. 5, and user terminal 520x is one of user terminals 520. FIG. 9A shows the processing for downlink transmission. In this case, access point 510x is transmitter 110 in FIG. 1 and user terminal 520x is receiver 150.

For downlink transmission, at access point 510x, traffic data is provided from a data source 912 to a TX data processor 920, which demultiplexes the traffic data into $N_C$ data streams, where $N_C \geq 1$. Traffic data may come from multiple data sources (e.g., one data source for each higher layer application) and the demultiplexing may not be needed. For simplicity, only one data source 912 is shown in FIG. 9A. TX data processor 920 formats, codes, interleaves, modulates, and scales each data stream in accordance with the transmission mode selected for that data stream to provide a corresponding scaled modulation symbol stream. The data rate, coding, and modulation for each data stream may be determined by a data rate control, a coding control, and a modulation control, respectively, provided by a controller 940. TX data processor 920 provides $N_C$ scaled modulation symbol streams to a TX spatial processor 928.

TX spatial processor 928 processes the $N_C$ scaled modulation symbol streams based on a selected transmission scheme, multiplexes in pilot symbols, and provides $N_{ap}$ transmit symbol streams to $N_{ap}$ transmitter units (TMTR) 930a through 930ap. The selected transmission scheme may be for transmit diversity, spatial multiplexing, or beam-steering. Transmit diversity entails transmitting data redundantly from multiple antennas and/or on multiple subbands to obtain diversity and improve reliability. A space-time transmit diversity (STTD) may be used for transmit diversity. Beam-steering entails transmitting data on a single (best) spatial channel at full power using the phase steering information for the principal eigenmode. Spatial multiplexing entails transmitting data on multiple spatial channels to achieve higher spectral efficiency. The spatial processing for spatial multiplexing is shown in Table 1. Each transmitter unit 930 performs OFDM processing on its transmit symbol stream to provide a corresponding OFDM symbol stream, which is further processed to generate a modulated signal. The $N_{ap}$ modulated signals from transmitter units 930a through 930ap are then transmitted via $N_{ap}$ antennas 932a through 932ap, respectively.

At user terminal 520x, the $N_{ap}$ transmitted signals are received by each of $N_{ut}$ antennas 952a through 952ut, and the received signal from each antenna is provided to an associated receiver unit (RCVR) 954. Each receiver unit 954 conditions and digitizes its received signal to provide a stream of samples, which is further processed to provide a corresponding stream of received symbols. Receiver units 954a through 954ut provide $N_{ut}$ received symbol streams to an RX spatial processor 962, which performs spatial processing based on the selected transmission scheme (e.g., as shown in Table 1 for spatial multiplexing). RX spatial processor 962 provides $N_C$ recovered symbol streams, which are estimates of the $N_C$ modulation symbol streams transmitted by access point 510x. An RX data processor 964 then demodulates, deinterleaves, and decodes each recovered symbol stream in accordance with the selected transmission mode to provide corresponding decoded data streams, which are estimates of the data streams transmitted by access point 511x. The processing by RX spatial processor 962 and RX data processor 964 is complementary to that performed by TX spatial processor 928 and TX data processor 920, respectively, at access point 510x.

A channel estimator 974 obtains estimates of one or more channel characteristics of the downlink and provides channel estimates to a controller 970. The channel estimates may be for channel gains, noise floor $N_{0,ut}$, and so on. RX data processor 964 may provide the status of each received data packet. Based on the various types of information received from channel estimator 974 and RX data processor 964, controller 970 determines a transmission mode for each of the multiple parallel channels on the downlink using the techniques described above. Each parallel channel may correspond to a wideband eigenmode (as described above) or some other combination of subbands and eigenmodes. Controller 970 provides feedback information, which may include the $N_C$ selected transmission modes for the downlink, the channel estimates, the terminal noise floor, ACKs and/or NAKs for the receive data packets, and so on, or any combination thereof. The feedback information is processed by a TX data processor 978 and a TX spatial processor 980, multiplexed with a steered reference, conditioned by transmitter units 954a through 954ut, and transmitted via antennas 952a through 952ut to access point 510x.

At access point 510x, the $N_{ut}$ transmitted signals from user terminal 520x are received by antennas 932a through 932ap, conditioned by receiver units 930a through 930ap, and processed by an RX spatial processor 934 and an RX data processor 936 to recover the feedback information sent by user terminal 520x. The feedback information is then provided to controller 940 and used to control the processing of the $N_C$ data streams sent to user terminal 520x. For example, the data rate, coding, and modulation of each downlink data stream may be determined based on the transmission mode selected by user terminal 520x. The received ACK/NAK may be used to initiate either a full retransmission or an incremental transmission of each data packet received in error by user terminal 520x. For an incremental transmission, a small portion of a data packet received in error is transmitted to allow user terminal 520x to recover the packet.

A channel estimator 944 obtains channel gain estimates based on the received steered reference. The channel gain estimates are provided to controller 940 and used (possibly along with the user terminal noise floor $N_{0,ut}$ estimate) to derive transmit weights for the downlink. Controller 940 provides the data rate controls to data source 912 and TX data processor 920. Controller 940 further provides the coding and modulation controls and the transmit weights to TX data processor 920. The channel estimation and transmission mode selection for downlink transmission may be performed as described above.

Controllers 940 and 970 direct the operation at access point 510*x* and user terminal 520*x*, respectively. Memory units 942 and 972 provide storage for program codes and data used by controllers 940 and 970, respectively.

Figure 9B:
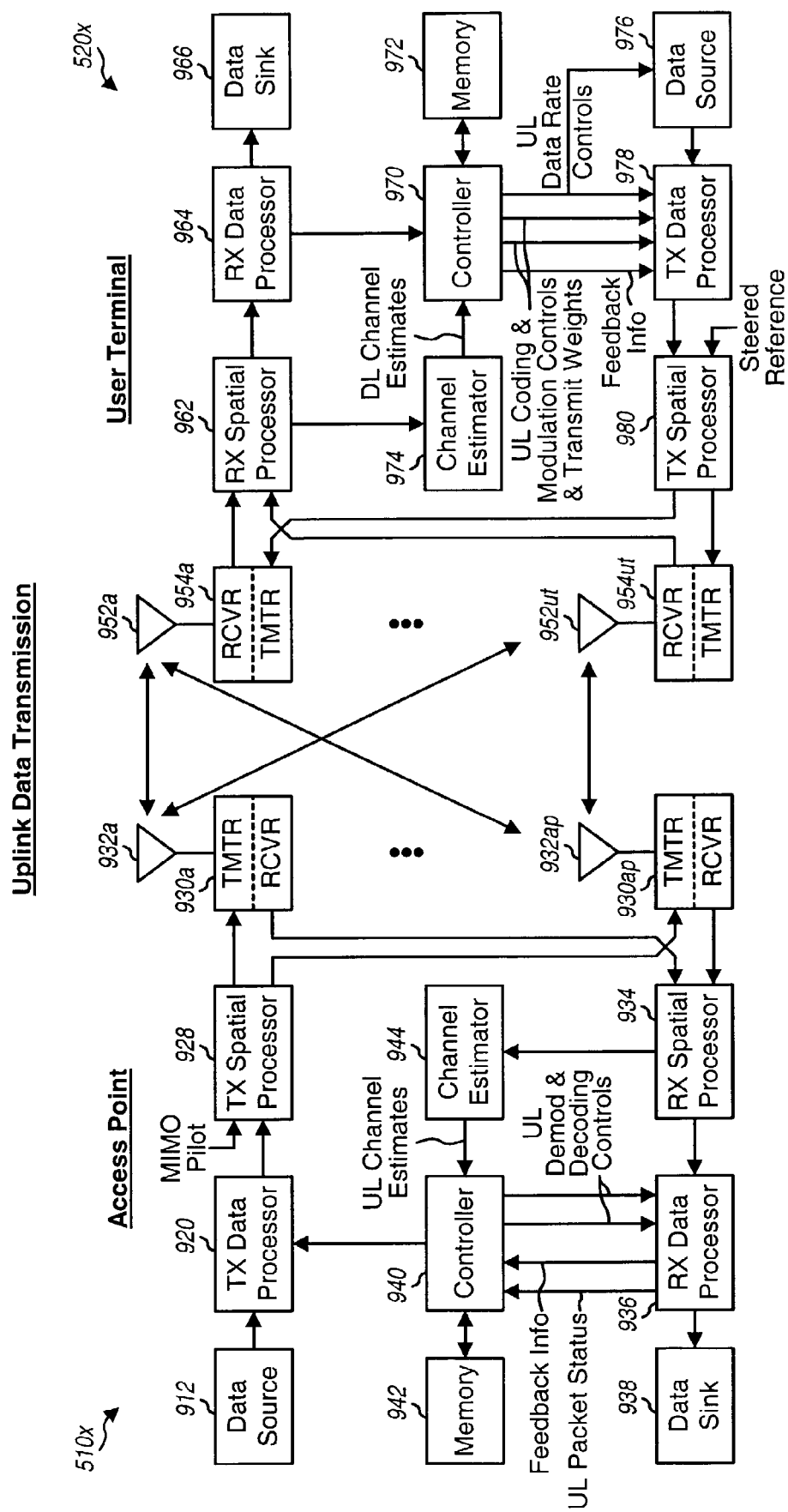

FIG. 9B shows access point 510*x* and user terminal 520*x* for uplink transmission. In this case, user terminal 520*x* is transmitter 110 in FIG. 1 and access point 510*x* is receiver 150. The channel estimation and transmission mode selection for uplink transmission may be performed as described above. The data processing at access point 510*x* and user terminal 520*x* for uplink transmission may be performed in a manner similar to that described above for downlink transmission. The spatial processing at access point 510*x* and user terminal 520*x* for uplink transmission may be performed as shown in Table 1.

A. Transmitter and Receiver Subsystems

For clarity, the processing at access point 510*x* and user terminal 520*x* for downlink transmission is described in further detail below.

Figure 10:
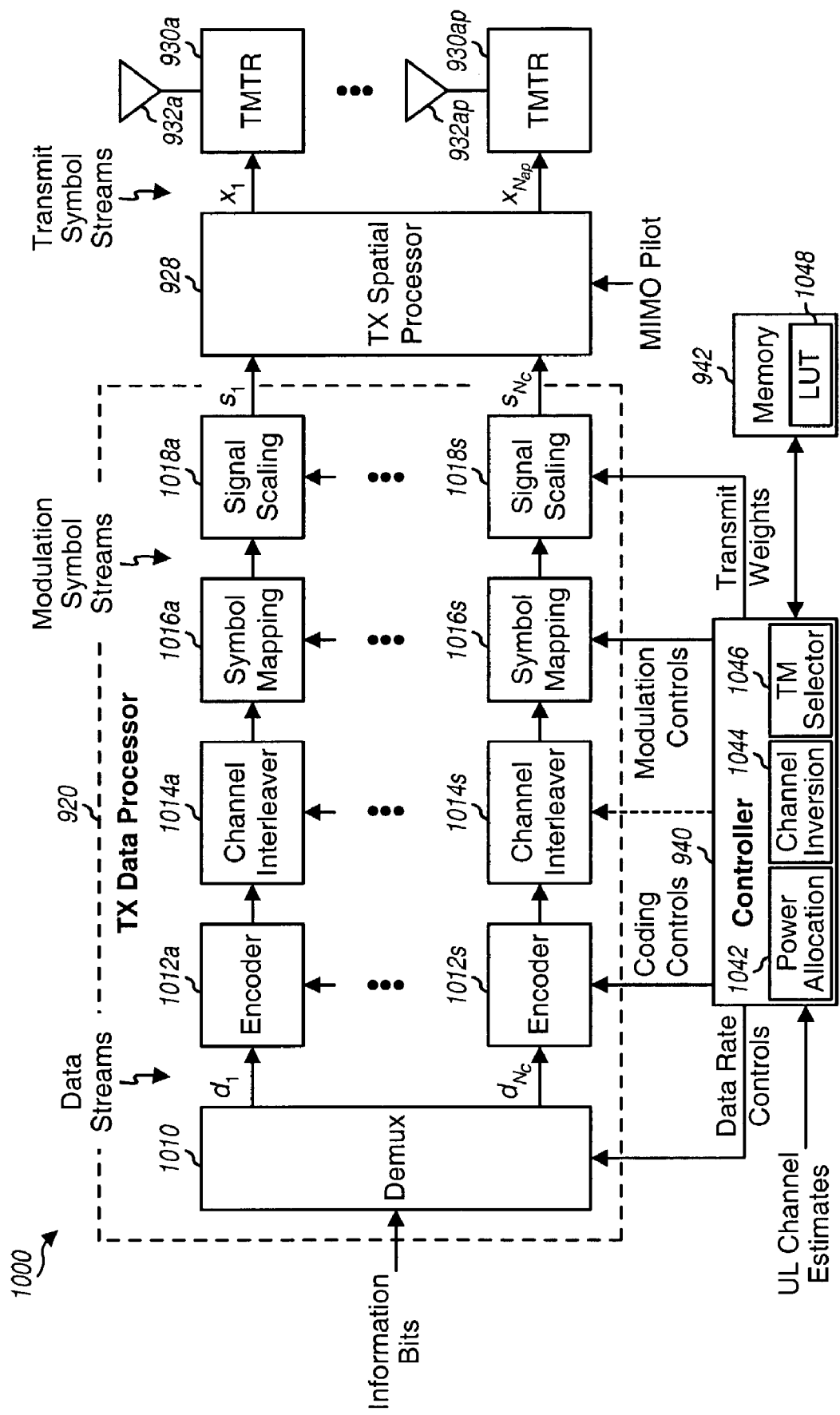
FIG. 10 shows a transmitter subsystem.

FIG. 10 shows a block diagram of a transmitter subsystem 1000, which is an embodiment of the transmitter portion of access point 510*x*. For this embodiment, TX data processor 920 includes a demultiplexer (Demux) 1010, $N_C$ encoders 1012*a* through 1012*s*, $N_C$ channel interleavers 1014*a* through 1014*s*, $N_C$ symbol mapping units 1016*a* through 1016*s*, and $N_C$ signal scaling units 1018*a* through 1018*s* (i.e., one set of encoder, channel interleaver, symbol mapping unit, and signal scaling unit for each of the $N_C$ data streams). Demultiplexer 1010 demultiplexes the traffic data (i.e., the information bits) into $N_C$ data streams, where each data stream is provided at the data rate indicated by the data rate control. Demultiplexer 1010 may be omitted if traffic data is already provided as $N_C$ data streams.

Each encoder 1012 receives and codes a respective data stream based on the selected coding scheme (as indicated by the coding control) to provide code bits. Each data stream may carry one or more data packets, and each data packet is typically coded separately to obtain a coded data packet. The coding increases the reliability of the data transmission. The selected coding scheme may include any combination of CRC coding, convolutional coding, turbo coding, block coding, and so on. The code bits from each encoder 1012 are provided to a respective channel interleaver 1014, which interleaves the code bits based on a particular interleaving scheme. If the interleaving is dependent on transmission mode, then controller 940 provides an interleaving control (as indicated by the dashed line) to channel interleaver 1014. The interleaving provides time, frequency, and/or spatial diversity for the code bits.

The interleaved bits from each channel interleaver 1014 are provided to a respective symbol mapping unit 1016, which maps the interleaved bits based on the selected modulation scheme (as indicated by the modulation control) to provide modulation symbols. Unit 1016 groups each set of B interleaved bits to form a B-bit binary value, where $B \geq 1$, and further maps each B-bit value to a specific modulation symbol based on the selected modulation scheme (e.g., QPSK, M-PSK, or M-QAM, where $M=2^B$). Each modulation symbol is a complex value in a signal constellation defined by the selected modulation scheme. The modulation symbols from each symbol mapping unit 1016 are then provided to a respective signal scaling unit 1018, which scales the modulation symbols with the transmit weights, $W_m(k)$ for $k \in K$, to achieve channel inversion and power distribution. Signal scaling units 1018*a* through 1018*s* provide $N_C$ scaled modulation symbol streams.

Each data stream is transmitted on a respective parallel channel that may include any number and any combination of subbands, transmit antennas, and spatial channels. For example, one data stream may be transmitted on all usable subbands of each wideband eigenmode, as described above. TX spatial processor 928 performs the required spatial processing, if any, on the $N_C$ scaled modulation symbol streams and provides $N_{ap}$ transmit symbol streams. The spatial processing may be performed as shown in Table 1.

For a transmission scheme whereby one data stream is transmitted on all subbands of each wideband eigenmode (for a full-CSI MIMO system, as described above), $N_S$ sets of encoder 1012, channel interleaver 1014, symbol mapping unit 1016, and signal scaling unit 1018 may be used to process $N_S$ data streams (where $N_C = N_S = N_{ap} \leq N_{ut}$ for a full rank channel response matrix) to provide $N_{ap}$ scaled modulation symbol streams. TX spatial processor 928 then performs spatial processing on the $N_{ap}$ scaled modulation symbol streams, as shown in Table 1, to provide the $N_{ap}$ transmit symbol streams.

For a transmission scheme whereby one data stream is transmitted on all subbands of each transmit antenna (for a partial-CSI MIMO system), $N_{ap}$ sets of encoder 1012, channel interleaver 1014, symbol mapping unit 1016, and signal scaling unit 1018 may be used to process $N_{ap}$ data streams (where $N_C = N_{ap}$) to provide $N_{ap}$ scaled modulation symbol streams. TX spatial processor 928 then simply passes each scaled modulation symbol stream as a transmit symbol stream. Since spatial processing is not performed for this transmission scheme, each transmit symbol is a modulation symbol.

In general, TX spatial processor 928 performs the appropriate demultiplexing and/or spatial processing of the scaled modulation symbols to obtain transmit symbols for the parallel channel used for each data stream. TX spatial processor 928 further multiplexes pilot symbols with the transmit symbols, e.g., using time division multiplex (TDM) or code division multiplex (CDM). The pilot symbols may be sent in all or a subset of the subbands/eigenmodes used to transmit traffic data. TX spatial processor 928 provides $N_{ap}$ transmit symbol streams to $N_{ap}$ transmitter units 930*a* through 930*ap*.

Each transmitter unit 930 performs OFDM processing on a respective transmit symbol stream and provides a corresponding modulated signal. The OFDM processing typically includes (1) transforming each set of $N_F$ transmit symbols to the time domain using an $N_F$-point inverse fast Fourier transform (IFFT) to obtain a "transformed" symbol that contains $N_F$ samples and (2) repeating a portion of each transformed symbol to obtain an OFDM symbol that contains $N_F + N_{cp}$ samples. The repeated portion is referred to as the cyclic prefix, and $N_{cp}$ indicates the number of samples being repeated. The OFDM symbols are further processed (e.g., converted to one or more analog signals, amplified, filtered, and frequency upconverted) by transmitter unit 930 to generate the modulated signal. Other designs for transmitter subsystem 1000 may also be implemented and are within the scope of the invention.

Controller 940 may perform various functions related to closed-loop rate control for the downlink and uplink (e.g., transmission mode selection for the uplink and transmit weight computation for the downlink). For uplink transmission, controller 940 may perform process 800 in FIG. 8 and selects a transmission mode for each of the multiple parallel channels on the uplink. Within controller 940, a power allocation unit 1042 distributes the total transmit power, $P_{total,up}$, to the multiple parallel channels (e.g., based on the channel gain estimates $\hat{\sigma}_m(k)$ and the noise floor estimate $N_{0,ap}$ for the access point). A channel inversion unit 1044 performs channel inversion for each parallel channel. A transmission mode (TM) selector 1046 selects a suitable transmission mode for each parallel channel. Memory unit 942 may store a look-up table 1048 for supported transmission modes and their required SNRs (e.g., as shown in Table 2). For downlink transmission, controller 940 may also perform process 800 in FIG. 8 to determine the transmit power for each subband of each wideband eigenmode and computes the transmit weights used for scaling modulation symbols prior to transmission on the downlink.

Figure 11:
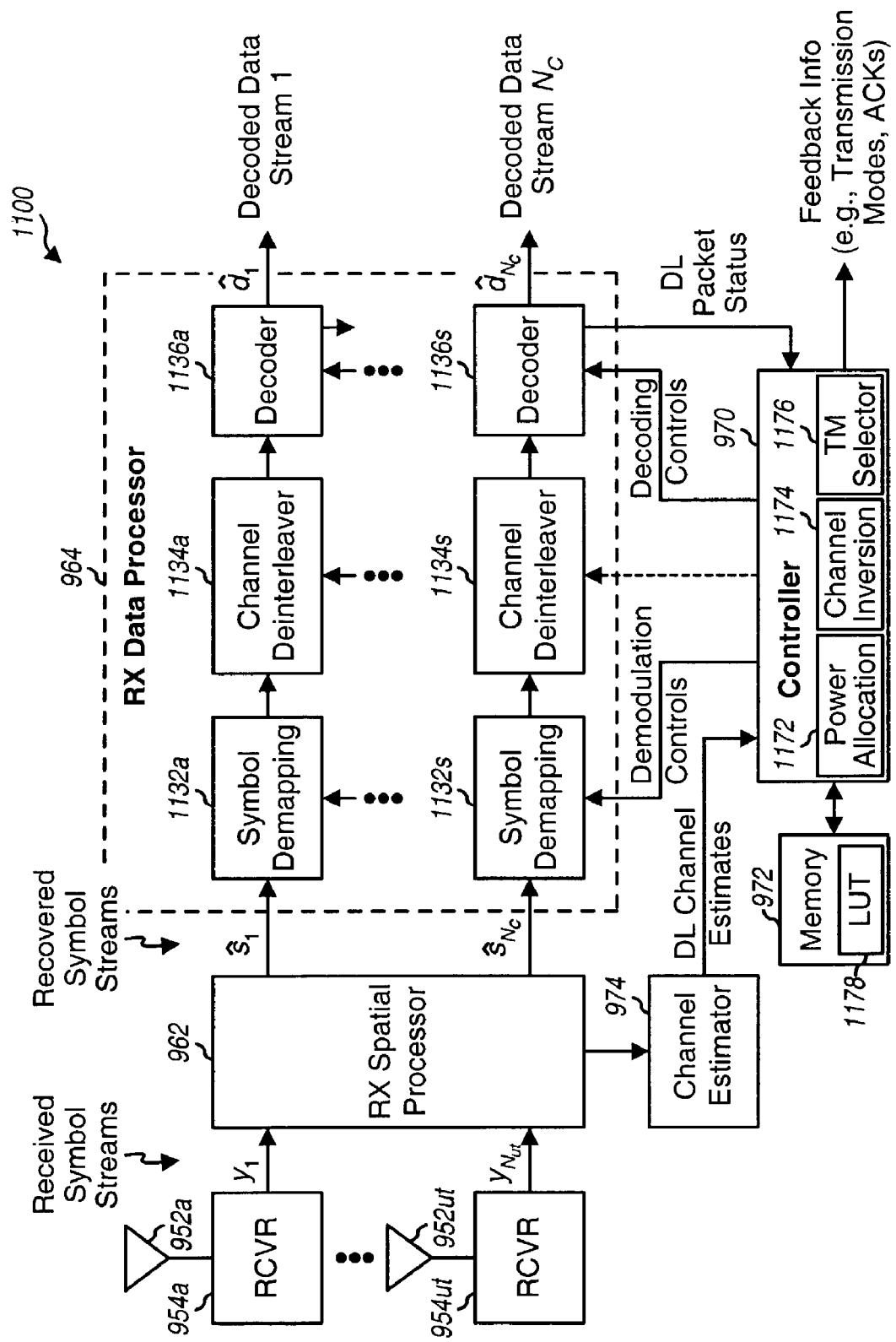
FIG. 11 shows a receiver subsystem.

FIG. 11 shows a block diagram of a receiver subsystem 1100, which is an embodiment of the receiver portion of user terminal 520x. The $N_{ap}$ transmitted signals from access point 510x are received by antennas 952a through 952ut, and the received signal from each antenna is provided to a respective receiver unit 954. Each receiver unit 954 conditions and digitizes its received signal to obtain a stream of samples, and further performs OFDM processing on the samples. The OFDM processing at the receiver typically includes (1) removing the cyclic prefix in each received OFDM symbol to obtain a received transformed symbol and (2) transforming each received transformed symbol to the frequency domain using a fast Fourier transform (FFT) to obtain a set of $N_F$ received symbols for the $N_F$ subbands. The received symbols are estimates of the transmit symbols sent by access point 510x. Receiver units 954a through 954ut provide $N_{ut}$ received symbol streams to RX spatial processor 962.

RX spatial processor 962 performs spatial or space-time processing on the $N_{ut}$ received symbol streams to provide $N_C$ recovered symbol streams. RX spatial processor 962 may implement a linear zero-forcing (ZF) equalizer (which is also referred to as a channel correlation matrix inversion (CCMI) equalizer), a minimum mean square error (MMSE) equalizer, an MMSE linear equalizer (MMSE-LE), a decision feedback equalizer (DFE), or some other equalizer.

RX data processor 964 receives the $N_C$ recovered symbol streams from RX spatial processor 962. Each recovered symbol stream is provided to a respective symbol demapping unit 1132, which demodulates the recovered symbols in accordance with the modulation scheme used for that stream, as indicated by a demodulation control provided by controller 970. The demodulated data stream from each symbol demapping unit 1132 is de-interleaved by an associated channel de-interleaver 1134 in a manner complementary to that performed at access point 510x for that data stream. If the interleaving is dependent on transmission mode, then controller 970 provides a deinterleaving control to channel de-interleaver 1134, as indicated by the dashed line. The de-interleaved data from each channel de-interleaver 1134 is decoded by an associated decoder 1136 in a manner complementary to that performed at access point 510x, as indicated by a decoding control provided by controller 970. For example, a turbo decoder or a Viterbi decoder may be used for decoder 1136 if turbo or convolutional coding, respectively, is performed at access point 510x. Decoder 1136 may also provide the status of each received data packet (e.g., indicating whether the packet was received correctly or in error). Decoder 1136 may further store demodulated data for packets decoded in error, so that this data may be combined with additional data from a subsequent incremental transmission and decoded.

In the embodiment shown in FIG. 11, channel estimator 974 estimates the channel response and the noise floor at user terminal 520x (e.g., based on the received pilot symbols) and provides the channel estimates to controller 970. Controller 970 performs various functions related to closed-loop rate control for both the downlink and uplink (e.g., transmission mode selection for the downlink and transmit weight computation for the uplink). For downlink transmission, controller 970 may perform process 800 in FIG. 8. Within controller 970, a power allocation unit 1172 distributes the total transmit power, $P_{total,dn}$, to the multiple parallel channels (e.g., based on the channel gain estimates $\hat{\sigma}_m(k)$ and the noise floor $N_{0,ut}$ estimate for the user terminal). A channel inversion unit 1174 performs channel inversion for each of the multiple parallel channels. A transmission mode (TM) selector 1176 selects a suitable transmission mode for each parallel channel. Memory unit 972 may store a look-up table 1178 for supported transmission modes and their required SNRs (e.g., as shown in Table 2). Controller 970 provides $N_C$ selected transmission modes for the $N_C$ parallel channels on the downlink, which may be part of the feedback information sent to access point 510x. For uplink transmission, controller 970 may also perform process 800 in FIG. 8 to determine the transmit power for each subband of each wideband eigenmode and computes the transmit weights used for scaling modulation symbols prior to transmission on the uplink.

For clarity, transmitter subsystem 1000 has been described for access point 510x and receiver subsystem 1100 has been described for user terminal 520x. Transmitter subsystem 1000 may also be used for the transmitter portion of user terminal 520x, and receiver subsystem 1100 may also be used for the receiver portion of access point 510x.

B. Downlink and Uplink Rate Control

Figures 12A, 12B:
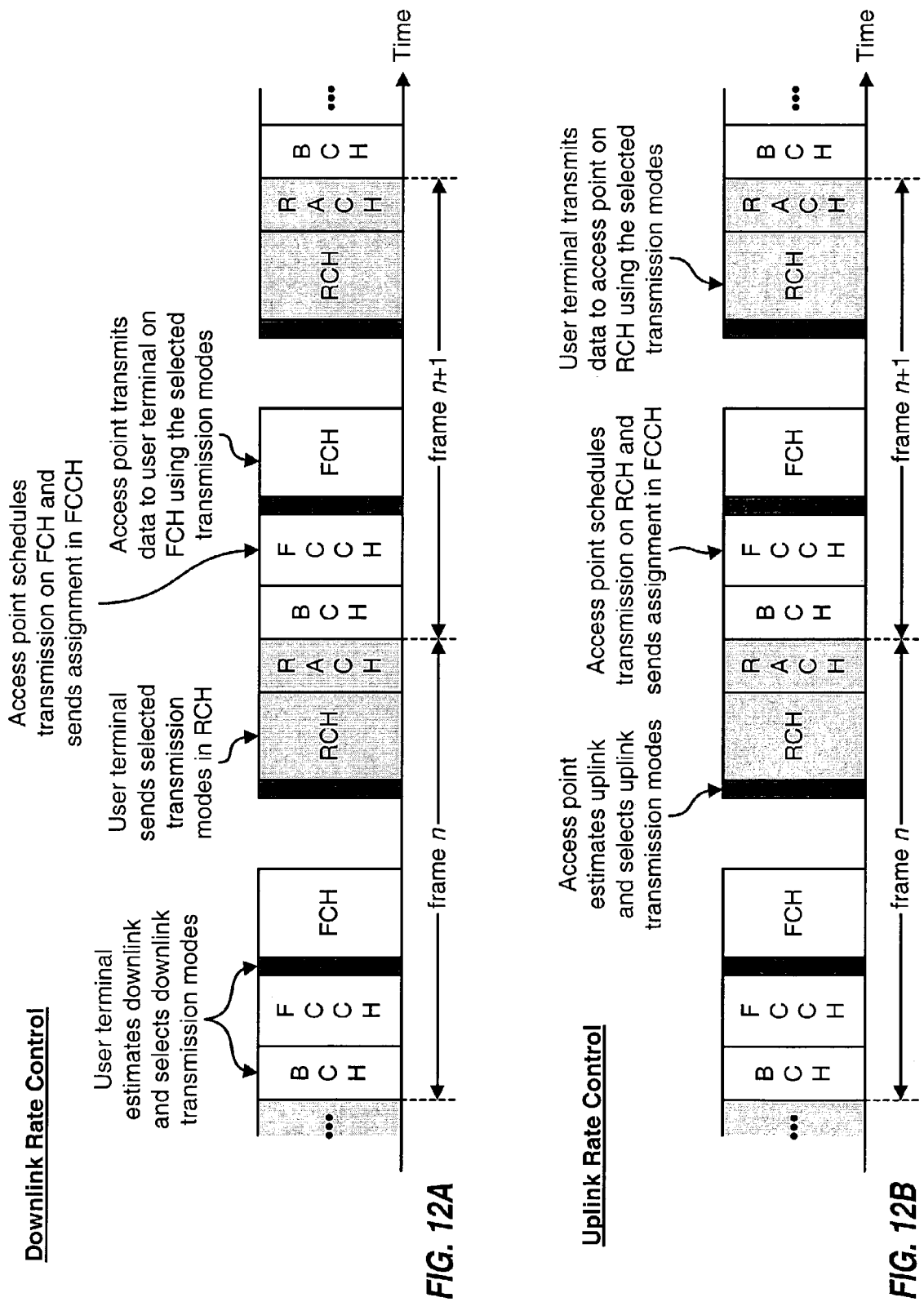
FIGS. 12A and 12B show exemplary timing diagrams for closed-loop rate control for the downlink and uplink, respectively.

FIG. 12A shows a process for performing closed-loop rate control for the downlink based on the frame structure shown in FIG. 6. A BCH PDU is transmitted in the first segment of each TDD frame (see FIG. 6) and includes the MIMO pilot that can be used by the user terminal to estimate and track the downlink. A steered reference may also be sent in the preamble of an FCH PDU sent to the user terminal. The user terminal estimates the downlink based on the MIMO pilot and/or the steered reference and selects a suitable transmission mode (with the highest supported data rate) for each downlink wideband eigenmode (i.e., each parallel channel). The user terminal then sends these transmission modes as "proposed" transmission modes for the downlink in an RCH PDU sent to the access point.

The access point receives the proposed transmission modes from the user terminal and schedules data transmission on the downlink in subsequent TDD frame(s). The access point selects the transmission modes for the downlink, which may be the ones received from the user terminal or some other transmission modes (with lower data rates), depending on system loading and other factors. The access point sends assignment information for the user terminal (which includes the transmission modes selected by the access point for downlink transmission) on the FCCH. The access point then transmits data on the FCH to the user terminal using the selected transmission modes. The user terminal receives the assignment information and obtains the transmission modes selected by the access point. The user terminal then processes the downlink transmission in accordance with the selected transmission mode. For the embodiment shown in FIG. 12A, the delay between the channel estimation and transmission mode selection by the user terminal and the use of these transmission modes for downlink transmission is typically one TDD frame, but may be different depending on applications, system configurations, and other factors.

FIG. 12B shows a process for performing closed-loop rate control for the uplink based on the frame structure shown in FIG. 6. The user terminal transmits a steered reference on the RACH during system access and on the RCH upon being assigned FCH/RCH resources (see FIG. 6). The access point estimates the uplink based on the received steered reference and selects a suitable transmission mode for each uplink wideband eigenmode. The access point sends assignment information for the user terminal (which includes the transmission modes selected for uplink transmission) on the FCCH. The user terminal transmits data on the RCH to the access point using the selected transmission modes. The access point processes the uplink transmission in accordance with the selected transmission modes.

The closed-loop rate control techniques described herein may be implemented by various means. For example, these techniques may be implemented in hardware, software, or a combination thereof. For a hardware implementation, the elements used for closed-loop rate control at the transmitter and the receiver (e.g., controllers 940 and 970) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, portions of the closed-loop rate control may be implemented with modules (e.g., procedures, functions, and so on) that perform the functions described herein. The software codes may be stored in a memory unit (e.g., memory unit 942 or 972 in FIGS. 9A and 9B) and executed by a processor (e.g., controller 940 or 970). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data on a plurality of parallel channels in a wireless communication system, comprising:
   in a first processing loop, adjusting at least one adjustment parameter for each of a plurality of parallel channels based on errors detected in received packets;
   in a second processing loop, determining channel estimates for each of the plurality of parallel channels, and selecting a transmission mode for each of the plurality of parallel channels based on an aggregation of the channel estimates and the at least one adjustment parameter for the parallel channel, wherein the selected transmission mode for each of the plurality of parallel channels determines a data rate for the parallel channel; and
   sending the selected transmission mode for each of the plurality of parallel channels to a transmitting entity, wherein data for each of the plurality of parallel channels is processed at the transmitting entity in accordance with the transmission mode selected for that parallel channel, and is transmitted through each parallel channel at the data rate determined by the transmission mode selected for the parallel channel.

2. The method of claim 1, wherein the adjustment parameter includes at least one signal to noise ratio offset.

3. The method of claim 2, wherein adjusting the at least one adjustment parameter includes determining the at least one adjustment parameter based, at least in part, on detected packet errors.

4. The method of claim 1, wherein the channel estimates include at least one signal to noise ratio.

5. An apparatus for transmitting data on a plurality of parallel channels in a wireless communication system, comprising:
   a means for performing a first processing loop to adjust at least one adjustment parameter for each of a plurality of parallel channels based on errors detected in received packets;
   a means for performing a second processing loop to determine channel estimates for each of the plurality of parallel channels, and select a transmission mode for each of the plurality of parallel channels based on an aggregation of the channel estimates and the at least one adjustment parameter for the parallel channel, wherein the selected transmission mode for each of the plurality of parallel channels determines a data rate for the parallel channel; and
   a means for sending the selected transmission mode for each of the plurality of parallel channels to a transmitting entity, wherein data for each of the plurality of parallel channels is processed at the transmitting entity in accordance with the transmission mode selected for the parallel channel, and is transmitted through each parallel channel at the data rate determined by the transmission mode selected for the parallel channel.

6. The apparatus of claim 5, wherein the adjustment parameter includes at least one signal to noise ratio offset.

7. The apparatus of claim 6, wherein the means for performing the first processing loop to adjust the at least one adjustment parameter is configured to adjust the at least one adjustment parameter based, at least in part, on detected packet errors.

8. The apparatus of claim 5, wherein the channel estimates include at least one signal to noise ratio.

9. A memory unit having instructions stored thereon for transmitting data on a plurality of parallel channels in a wireless communication system, the instructions, when executed by one or more processors, directing the one or more processors to perform the steps of:
   performing a first processing loop to adjust at least one adjustment parameter for each of a plurality of parallel channels based on errors detected in received packets;
   performing a second processing loop to determine channel estimates for each of the plurality of parallel channels, and select a transmission mode for each of the plurality of parallel channels based on an aggregation of the channel estimates and the at least one adjustment parameter for the parallel channel, wherein the selected transmission mode for each of the plurality of parallel channels determines a data rate for the parallel channel; and sending the selected transmission mode for each of the plurality of parallel channels to a transmitting entity, wherein data for each of the plurality of parallel channels is processed at the transmitting entity in accordance with the transmission mode selected for the parallel channel, and is transmitted through each parallel channel at the data rate determined by the transmission mode selected for the parallel channel.

10. The memory unit of claim 9, wherein the adjustment parameter includes at least one signal to noise ratio offset.

11. The memory unit of claim 10, wherein the instructions for performing the first processing loop comprises instructions for adjusting the at least one adjustment parameter based, at least in part, on detected packet errors.

12. The memory unit of claim 9, wherein the channel estimates include at least one signal to noise ratio.

13. An apparatus for transmitting data on a plurality of parallel channels in a wireless communication system, comprising:

at least one processor configured to, perform a first processing loop to adjust at least one adjustment parameter for each of a plurality of parallel channels based on errors detected in received packets; and perform a second processing loop to determine channel estimates for each of the plurality of parallel channels, and select a transmission mode for each of the plurality of parallel channels based on an aggregation of the channel estimates and the at least one adjustment parameter for the parallel channel, wherein the selected transmission mode for each of the plurality of parallel channels determines a data rate for the parallel channel, and send the selected transmission mode for each of the plurality of parallel channels to a transmitting entity, wherein data for each of the plurality of parallel channels is processed at the transmitting entity in accordance with the transmission mode selected for the parallel channel, and is transmitted through each parallel channel at the data rate determined by the transmission mode selected for the parallel channel; and at least one memory coupled to the processor.

14. The apparatus of claim 13, wherein the adjustment parameter includes at least one signal to noise ratio offset.

15. The apparatus of claim 14, wherein the processor is configured to adjust the at least one adjustment parameter based, at least in part, on detected packet errors.

16. The apparatus of claim 13, wherein the channel estimates include at least one signal to noise ratio.

* * * * *